US012803698B2

(12) United States Patent
Kawai et al.

(10) Patent No.: US 12,803,698 B2
(45) Date of Patent: Nov. 17, 2026

(54) CHARACTERISTIC MEASUREMENT APPARATUS, CHARACTERISTIC MEASUREMENT METHOD AND COMPUTER PROGRAM

(71) Applicant: NTT, Inc., Tokyo (JP)

(72) Inventors: Akira Kawai, Musashino (JP); Masanori Nakamura, Musashino (JP); Takayuki Kobayashi, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 295 days.

(21) Appl. No.: 18/727,823

(22) PCT Filed: Sep. 28, 2022

(86) PCT No.: PCT/JP2022/036151
§ 371 (c)(1),
(2) Date: Jul. 10, 2024

(87) PCT Pub. No.: WO2023/135869
PCT Pub. Date: Jul. 20, 2023

(65) Prior Publication Data

US 2025/0096919 A1 Mar. 20, 2025

(30) Foreign Application Priority Data

Jan. 13, 2022 (WO) .................. PCT/JP2022/000858

(51) Int. Cl.
*H04B 10/06* (2006.01)
*H04J 14/02* (2006.01)
*H04J 14/06* (2006.01)

(52) U.S. Cl.
CPC ........ *H04J 14/02216* (2023.08); *H04J 14/06* (2013.01)

(58) Field of Classification Search
CPC .... H04B 10/613; H04B 10/61; H04B 10/614; H04B 10/6162; H04B 10/6161;
(Continued)

(56) References Cited

U.S. PATENT DOCUMENTS 8,472,814 B2 * 6/2013 Zhang ................ H04B 10/6161 398/208
2008/0310534 A1 12/2008 Egashira et al.
(Continued)

FOREIGN PATENT DOCUMENTS

JP 6319487 B1 5/2018
JP 2020141294 A 9/2020

OTHER PUBLICATIONS

Takayuki Kobayashi, et al., "35-Tb/s C-band Transmission over 800 km Employing 1-Tb/s PS-64QAM signals enhanced by Complex 8 x 2 MIMO Equalizer", Optical Fiber Communication Conference Postdeadline Papers 2019, Th4B.2, 2019.
(Continued)

*Primary Examiner* — Hanh Phan
(74) *Attorney, Agent, or Firm* — Harness, Dickey & Pierce, P.L.C.

(57) ABSTRACT

A characteristic measurement device that measures a characteristic between lanes of a transmitter and a receiver connected via an optical fiber transmission path, the characteristic measurement device including an adaptive equalization unit that uses a polarization multiplexed reception signal and a phase conjugate signal of the polarization multiplexed reception signal or a plurality of signals mathematically equivalent to the reception signal and the phase conjugate signal of the reception signal as input signals and performs equalization processing on the input signals, and a characteristic function derivation unit that calculates a first inverse characteristic representing an inverse characteristic of the transmitter and a second inverse characteristic repre-
(Continued)

senting an inverse characteristic of the receiver on the basis of a filter coefficient obtained at the time of the equalization processing performed by the adaptive equalization unit and a frequency offset.

9 Claims, 11 Drawing Sheets

(58) Field of Classification Search
CPC ............ H04B 10/6163; H04B 10/6164; H04B 10/6165; H04B 10/6166; H04B 10/0795; H04B 10/40; H04B 10/516; H04B 10/532; H04B 10/548; H04B 10/2513; H04B 10/2507; H04J 14/06
USPC ....... 398/202, 208, 209, 203, 204, 205, 206, 398/207, 147, 81, 79, 135, 136, 158, 159, 398/33, 38, 25, 26, 27, 65, 152, 183, 184, 398/188, 213, 214
See application file for complete search history.

(56) References Cited

U.S. PATENT DOCUMENTS

| | | | | |
|---|---|---|---|---|
| 2010/0303474 | A1 | 12/2010 | Nakashima et al. | |
| 2012/0057863 | A1 | 3/2012 | Winzer et al. | |
| 2012/0189320 | A1 | 7/2012 | Zelensky et al. | |
| 2016/0112143 | A1 | 4/2016 | Yu et al. | |
| 2020/0036440 | A1 | 1/2020 | Yamagishi et al. | |
| 2021/0218476 | A1* | 7/2021 | Masuda | H04B 10/6166 |
| 2022/0149974 | A1 | 5/2022 | Kobayashi et al. | |
| 2024/0405874 | A1* | 12/2024 | Sato | H04B 10/2513 |

OTHER PUBLICATIONS

Pierluigi Poggiolini, et al., "Analytical and Experimental Results on System Maximum Reach Increase Through Symbol Rate Optimization", Journal of Lightwave Technology, vol. 34, No. 8, 1872-1885, 2016.

Rafael Rios-Muller, et al., "Blind Receiver Skew Compensation and Estimation for Long-Haul Non-Dispersion Managed Systems Using Adaptive Equalizer", Jounal of Lightwave Technology, vol. 33, No. 7, Apr. 1, 2015, p. 1315-1318.

C.R.S. Fludger, et al., "Transmitter Impairment Mitigation and Monitoring for High Baud-Rate, High Order Modulation Systems", 42nd European Conference and Exhibition on Optical Communications, Sep. 18-22, 2016.

John J. Shynk, "Frequency-Domain and Multirate Adaptive Filtering", IEEE SP Magazine, Jan. 1992.

Manabu Arikawa et al., "Transmitter and receiver impairment monitoring using adaptive multi-layer linear and widely linear filter coefficients controlled by stochastic gradient descent", Optics Express vol. 29, No. 8, Apr. 12, 2021, pp. 11548-11561.

Akira Kawai et al., "4-Dimensional IQ Characteristic Estimation for Polarization-multiplexed Coherent Transceivers", OFC 2022, 2022.

* cited by examiner

CHARACTERISTIC MEASUREMENT APPARATUS, CHARACTERISTIC MEASUREMENT METHOD AND COMPUTER PROGRAM

CROSS-REFERENCE TO RELATED APPLICATIONS

This application is a 371 U.S. National Phase of International Application No. PCT/JP2022/036151, filed on Sep. 28, 2022, which claims priority to International Application No. PCT/JP2022/000858, filed on Jan. 13, 2022. The entire disclosures of the above applications are incorporated herein by reference.

TECHNICAL FIELD

The present invention relates to a characteristic measurement device, a characteristic measurement method, and a computer program.

The present application claims priority on the basis of PCT/JP2022/000858 filed in Japan on Jan. 13, 2022, the contents of which are incorporated herein by reference.

BACKGROUND ART

Optical communication using an optical fiber (hereinafter, referred to as an "optical transmission system") has advantages that an available frequency band is wide and attenuation of a signal is small. Therefore, the optical transmission system can perform long-distance and large-capacity communication, and is widely used for modern fixed lines. In the optical transmission system, highly reliable optical communication is implemented by compensating for signal distortion occurring in an optical transceiver or an optical fiber transmission path by digital signal processing.

In recent years, a polarization division multiplexing system that transmits and receives signals using two polarization degrees of freedom of light as independent channels has been put into practical use, and has been widely applied to a long-distance large-capacity system in combination with wavelength division multiplexing that multiplexes signals using light of different wavelengths. Moreover, as a method of improving multiplicity, a spatial division multiplexing system that transmits and receives signals using core modes of a multi-core fiber and a multi-mode fiber as independent channels has also been studied.

As one of means for improving a capacity to be transmitted in the optical transmission system, there are higher-order multivalued transmission/reception signals and higher baud rate (modulation rate) transmission/reception signals. However, a high-order multivalued high baud rate signal is greatly affected by signal waveform distortion due to skew, imbalance, crosstalk or the like relatively occurring between IQ lanes of each signal. Therefore, it is necessary to compensate for these signal waveform distortions in a transceiver.

Then, a method of compensating for signal distortion occurring inside a transceiver by using an adaptive filter having a special configuration such as a multistage configuration in a receiver has been proposed (refer to, for example, Non Patent Literature 1). The method disclosed in Non Patent Literature 1 increases an internal degree of freedom of a multiple-input/multiple-output (MIMO) adaptive filter mounted on a coherent optical receiver in order to compensate for distortion occurring in a polarization degree of freedom, so that the signal distortion caused by an IQ characteristic of the transceiver can also be compensated for. However, the multistage configuration has instability in convergence, and the waveform distortion derived from IQ characteristics have many temporally static components. In contrast, the technology disclosed in Non Patent Literature 1 has a problem that calculation efficiency is poor because compensation is dynamically performed for each symbol.

Therefore, a next most promising technology is a method of estimating a transfer function of a transmitter and a receiver by some method and inputting an inverse function thereof to a (pre-) equalization filter circuit of the transmitter and the receiver as a fixed value to compensate for signal distortion. In order to perform this method, it is necessary to measure a characteristic of the transceiver in advance and obtain a fixed value to be input to the filter. As one method of measuring a characteristic of the transceiver, a method using a multistage MIMO adaptive filter has been proposed (refer to, for example, Non Patent Literature 2). In the method disclosed in Non Patent Literature 2, first, a normal reception signal is adaptively compensated for using a multistage MIMO configuration, and a value of a coefficient of an adaptive filter obtained at that time is analyzed to measure a transceiver characteristic.

CITATION LIST

Non Patent Literature

Non Patent Literature 1: C. R. S. Fludger and T. Kupfer, "Transmitter Impairment Mitigation and Monitoring for High Baud-Rate, High Order Modulation Systems", 42nd European Conference and Exhibition on Optical Communications, p. 256-258 (2016)

Non Patent Literature 2: Manabu Arikawa and Kazunori Hayashi, "Transmitter and receiver impairment monitoring using adaptive multi-layer linear and widely linear filter coefficients controlled by stochastic gradient descent", Opt. Express 29, 11548-11561 (2021)

SUMMARY OF INVENTION

Technical Problem

However, the existing measurement technology handles the polarization, wavelength, core, and mode independently so far, and can evaluate an IQ characteristic within one polarization, wavelength, core, and mode, but cannot derive the characteristic of the transceiver that is operating in a case where there is crosstalk between lanes beyond them. For example, in the optical transmission using a single-mode fiber, there is a possibility that crosstalk occurs between a Q lane of an X-polarized wave and an I lane of a Y-polarized wave in an optical modulator driver circuit of the transmitter or an optical reception circuit of the receiver, but such crosstalk cannot be expressed by a combination of IQ crosstalk in the polarized wave and polarization rotation. Therefore, the existing measurement technology has a problem that it is not possible to calculate the characteristic of the transceiver including the IQ crosstalk across a plurality of polarized waves.

In view of the above circumstances, an object of the present invention is to provide a technology capable of calculating a characteristic of a transceiver including IQ crosstalk across a plurality of polarized waves.

Solution to Problem

An aspect of the present invention is a characteristic measurement device that measures a characteristic between lanes of a transmitter and a receiver connected via an optical fiber transmission path, the characteristic measurement device including an adaptive equalization unit that uses a polarization multiplexed reception signal and a phase conjugate signal of the polarization multiplexed reception signal or a plurality of signals mathematically equivalent to the reception signal and the phase conjugate signal of the reception signal as input signals and performs equalization processing on the input signals, and a characteristic function derivation unit that calculates a first inverse characteristic representing an inverse characteristic of the transmitter and a second inverse characteristic representing an inverse characteristic of the receiver on the basis of a filter coefficient obtained at a time of the equalization processing performed by the adaptive equalization unit and a frequency offset.

An aspect of the present invention is an optical transmission system including the characteristic measurement device, and the transmitter and the receiver having a filter function of compensating for signal waveform distortion on the basis of the first inverse characteristic and the second inverse characteristic obtained by the characteristic measurement device.

An aspect of the present invention is a characteristic measurement method performed by a characteristic measurement device that measures a characteristic between lanes of a transmitter and a receiver connected via an optical fiber transmission path, the characteristic measurement method including using a polarization multiplexed reception signal and a phase conjugate signal of the polarization multiplexed reception signal or a plurality of signals mathematically equivalent to the reception signal and the phase conjugate signal of the reception signal as input signals and performing equalization processing on the input signals, and calculating a first inverse characteristic representing an inverse characteristic of the transmitter and a second inverse characteristic representing an inverse characteristic of the receiver on the basis of a filter coefficient obtained at a time of the equalization processing and a frequency offset.

An aspect of the present invention is a computer program that causes a computer to function as a characteristic measurement device that measures a characteristic between lanes of a transmitter and a receiver connected via an optical fiber transmission path, the computer program causing the computer to execute an adaptive equalization step of using a polarization multiplexed reception signal and a phase conjugate signal of the polarization multiplexed reception signal or a plurality of signals mathematically equivalent to the reception signal and the phase conjugate signal of the reception signal and performing equalization processing on the input signals, and a characteristic function derivation step of calculating a first inverse characteristic representing an inverse characteristic of the transmitter and a second inverse characteristic representing an inverse characteristic of the receiver on the basis of a filter coefficient obtained at a time of the equalization processing performed at the adaptive equalization step and a frequency offset.

Advantageous Effects of Invention

According to the present invention, a characteristic of a transceiver including IQ crosstalk across a plurality of polarized waves can be calculated.

DESCRIPTION OF EMBODIMENTS

Hereinafter, an embodiment of the present invention will be described with reference to the drawings.

First Embodiment

Figure 1:
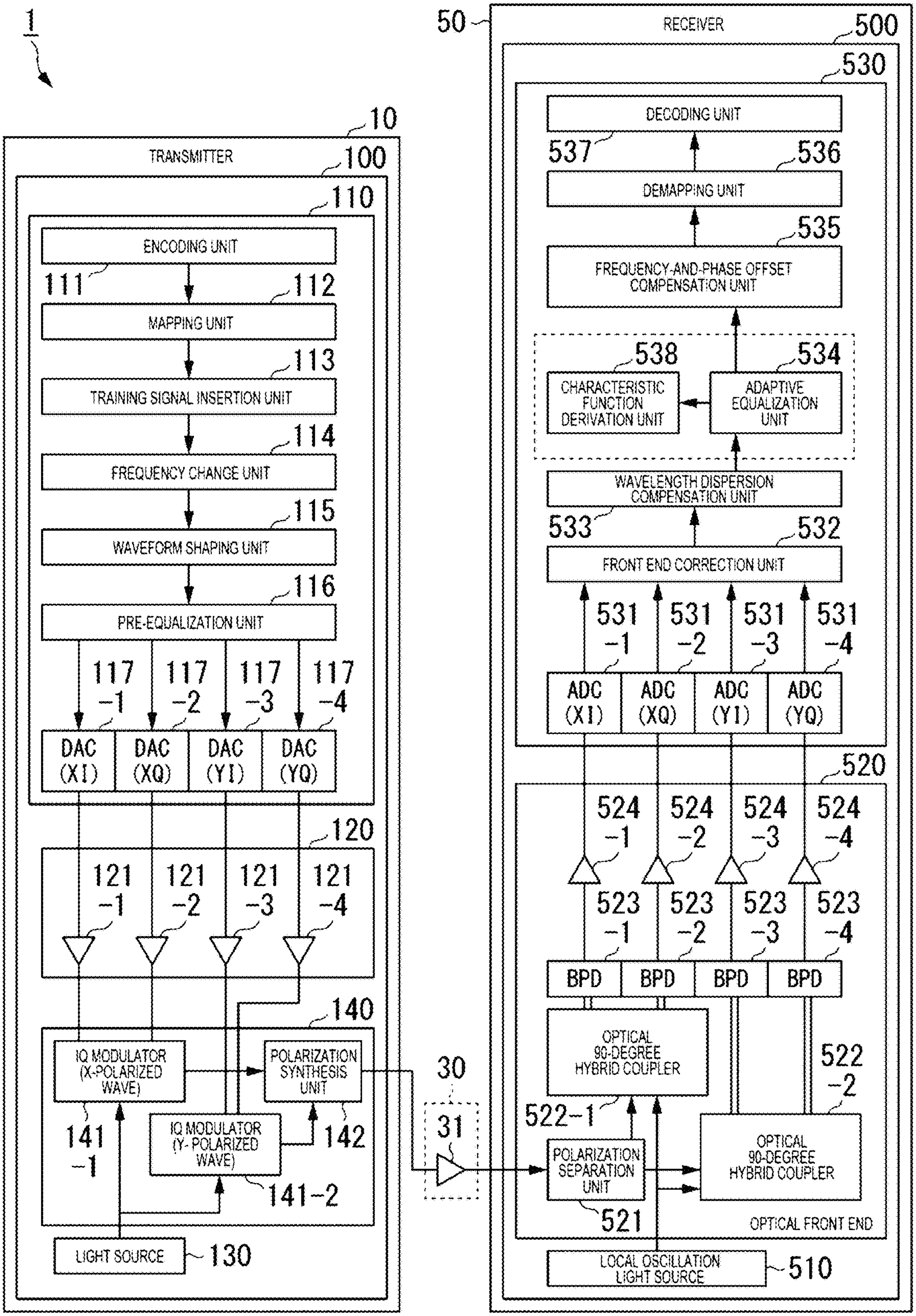
FIG. 1 is a diagram illustrating a configuration example of a digital coherent optical transmission system in a first embodiment.

FIG. 1 is a diagram illustrating a configuration example of a digital coherent optical transmission system 1 in a first embodiment. The digital coherent optical transmission system 1 includes a transmitter 10 and a receiver 50. The receiver 50 receives a polarization multiplexed signal from the transmitter 10.

The transmitter 10 includes one or more transmission units 100. The transmission unit 100 outputs an optical signal of a specified wavelength to an optical fiber transmission path 30. The optical fiber transmission path 30 includes any number of optical amplifiers 31. Each optical amplifier 31 receives an input of the optical signal from the optical fiber transmission path 30 on the transmitter 10 side to amplify, and outputs the same to the optical fiber transmission path 30 on the receiver 50 side. The receiver 50 includes one or more reception units 500. The reception unit 500 receives the optical signal.

The transmission unit 100 includes a digital signal processing unit 110, a modulator driver 120, a light source 130, and an integration module 140. The digital signal processing unit 110 includes an encoding unit 111, a mapping unit 112, a training signal insertion unit 113, a frequency change unit 114, a waveform shaping unit 115, a pre-equalization unit 116, and digital-to-analog converters (DACs) 117-1 to 117-4.

The encoding unit 111 outputs a transmission signal obtained by performing forward error correction (FEC)

encoding on a transmission bit string. The mapping unit 112 maps the transmission signal output from the encoding unit 111 to a symbol. The training signal insertion unit 113 inserts a known training signal into the transmission signal mapped to the symbol by the mapping unit 112. The frequency change unit 114 performs up-sampling by changing a sampling frequency for the transmission signal into which the training signal is inserted. The waveform shaping unit 115 limits a band of the transmission signal subjected to sampling.

The pre-equalization unit 116 compensates for distortion of a waveform of the transmission signal, the band of which is limited by the waveform shaping unit 115, and outputs the same to the DACs 117-1 to 117-4. The DAC 117-1 converts an I (in-phase) component of an X-polarized wave of the transmission signal input from the pre-equalization unit 116 from a digital signal to an analog signal, and outputs the same to the modulator driver 120. The DAC 117-2 converts a Q (orthogonal) component of the X-polarized wave of the transmission signal input from the pre-equalization unit 116 from a digital signal to an analog signal, and outputs the same to the modulator driver 120. The DAC 117-3 converts an I component of a Y-polarized wave of the transmission signal input from the pre-equalization unit 116 from a digital signal to an analog signal, and outputs the same to the modulator driver 120. The DAC 117-4 converts a Q component of the Y-polarized wave of the transmission signal input from the pre-equalization unit 116 from a digital signal to an analog signal, and outputs the same to the modulator driver 120.

The modulator driver 120 includes amplifiers 121-1 to 121-4. The amplifier 121-*i* (i is an integer of 1 or larger and 4 or smaller) amplifies the analog signal output from the DAC 117-*i*, and drives a modulator of the integration module 140 by the amplified analog signal. The light source 130 is, for example, an LD (semiconductor laser). The light source 130 outputs light of a specified wavelength.

The integration module 140 includes IQ modulators 141-1 and 141-2 and a polarization synthesis unit 142. The IQ modulator 141-1 outputs an optical signal of the X-polarized wave generated by modulating the optical signal output by the light source 130 with the I component of the X-polarized wave output from the amplifier 121-1 and the Q component of the X-polarized wave output from the amplifier 121-2. The IQ modulator 141-2 outputs an optical signal of the Y-polarized wave generated by modulating the optical signal output by the light source 130 with the I component of the Y-polarized wave output from the amplifier 121-3 and the Q component of the Y-polarized wave output from the amplifier 121-4. The polarization synthesis unit 142 performs polarization multiplexing on the optical signal of the X-polarized wave output by the IQ modulator 141-1 and the optical signal of the Y-polarized wave output by the IQ modulator 141-2 to output.

The reception unit 500 includes a local oscillation light source 510, an optical front end 520, and a digital signal processing unit 530. The local oscillation light source 510 is, for example, an LD. The local oscillation light source 510 outputs local oscillator (LO).

The optical front end 520 converts an optical signal into an electric signal while keeping a phase and amplitude of a phase modulation signal subjected to polarization multiplexing. The optical front end 520 includes a polarization separation unit 521, optical 90-degree hybrid couplers 522-1 and 522-2, balanced photo diodes (BPDs) 523-1 to 523-4, and amplifiers 524-1 to 524-4.

The polarization separation unit 521 separates the input optical signal into the X-polarized wave and the Y-polarized wave. The polarization separation unit 521 outputs the optical signal of the X-polarized wave to the optical 90-degree hybrid coupler 522-1, and outputs the optical signal of the Y-polarized wave to the optical 90-degree hybrid coupler 522-2.

The optical 90-degree hybrid coupler 522-1 causes the optical signal of the X-polarized wave and the local oscillator output from the local oscillation light source 510 to interfere with each other, and extracts an I component and a Q component of a reception photoelectric field. The optical 90-degree hybrid coupler 522-1 outputs the extracted I component and Q component of the X-polarized wave to the BPDs 523-1 and 523-2, respectively.

The optical 90-degree hybrid coupler 522-2 causes the optical signal of the Y-polarized wave and the local oscillator output from the local oscillation light source 510 to interfere with each other, and extracts an I component and a Q component of a reception photoelectric field. The optical 90-degree hybrid coupler 522-2 outputs the extracted I component and Q component of the Y-polarized wave to the BPDs 523-3 and BPD 523-4, respectively.

The BPDs 523-1 to 523-4 are differential input type photoelectric converters. The BPD 523-*i* outputs, to the amplifier 524-*i*, a difference value between photocurrents generated in two photodiodes having even characteristics. The BPD 523-1 converts the I component of the reception signal of the X-polarized wave into an electric signal, and outputs the same to the amplifier 524-1. The BPD 523-2 converts the Q component of the reception signal of the X-polarized wave into an electric signal, and outputs the same to the amplifier 524-2. The BPD 523-3 converts the I component of the reception signal of the Y-polarized wave into an electric signal, and outputs the same to the amplifier 524-3. The BPD 523-4 converts the Q component of the reception signal of the Y-polarized wave into an electric signal, and outputs the same to the amplifier 524-4. The amplifier 524-*i* (i is an integer of 1 or larger and 4 or smaller) amplifies the electric signal output from the BPD 523-*i*, and outputs the same to the digital signal processing unit 530.

The digital signal processing unit 530 includes analog-to-digital converters (ADCs) 531-1 to 531-4, a front end correction unit 532, a wavelength dispersion compensation unit 533, an adaptive equalization unit (adaptive equalizer) 534, a frequency-and-phase offset compensation unit 535, a demapping unit 536, a decoding unit 537, and a characteristic function derivation unit (characteristic function deriver) 538. The ADC 531-*i* (i is an integer of 1 or larger and 4 or smaller) converts the electric signal output from the amplifier 524-*i* from an analog signal to a digital signal, and outputs the same to the front end correction unit 532.

The front end correction unit 532 receives an input of the I component of the reception signal of the X-polarized wave from the ADC 531-1, receives an input of the Q component of the reception signal of the X-polarized wave from the ADC 531-2, receives an input of the I component of the reception signal of the Y-polarized wave from the ADC 531-3, and receives an input of the Q component of the reception signal of the Y-polarized wave from the ADC 531-4. The front end correction unit 532 uses each input signal to generate a reception signal subjected to compensation for frequency characteristic in the optical front end 520, and outputs the same to the wavelength dispersion compensation unit 533.

The wavelength dispersion compensation unit 533 estimates wavelength dispersion performed in the optical fiber transmission path 30, compensates for the estimated wavelength dispersion for the electric signal output from the front end correction unit 532, and outputs the same to the adaptive equalization unit 534. The adaptive equalization unit 534 adaptively performs equalization processing on the reception signal output from the wavelength dispersion compensation unit 533. The adaptive equalization unit 534 outputs a filter coefficient obtained at the time of the equalization processing and a frequency offset to the characteristic function derivation unit 538, and outputs the reception signal subjected to the equalization processing to the frequency-and-phase offset compensation unit 535. The frequency-and-phase offset compensation unit 535 performs processing such as compensation for the frequency offset and phase noise on the reception signal subjected to the equalization processing by the adaptive equalization unit 534.

The demapping unit 536 determines the symbol of the reception signal output by the frequency-and-phase offset compensation unit 535, and converts the determined symbol into binary data. The decoding unit 537 performs error correction decoding processing such as FEC on the binary data demapped by the demapping unit 536, thereby obtaining a reception bit string.

The characteristic function derivation unit 538 derives an inverse characteristic of the transmitter 10 and an inverse characteristic of the receiver 50 on the basis of the filter coefficient obtained from the adaptive equalization unit 534 and the frequency offset. In a (pre-) equalization filter circuit of the transmitter or the receiver, waveform distortion occurring between IQ lanes of the transmitter 10 and the receiver 50 can be compensated for by inputting the inverse characteristic derived by the characteristic function derivation unit 538 as a fixed value.

Note that, although an example of one optical fiber transmission path is described in the above-described embodiment, the same applies in a spatially multiplexed transmission system (for example, a multi-core fiber, a multi-mode fiber, and free space transmission).

Figure 2:
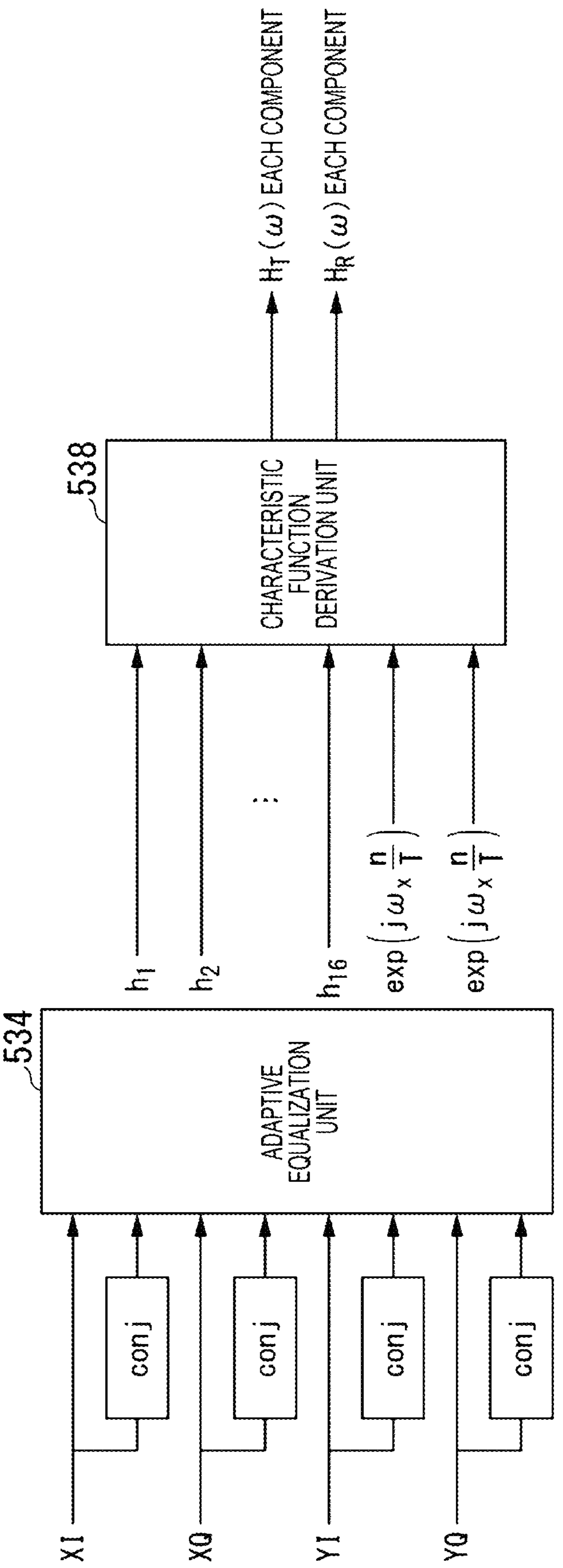
FIG. 2 is a diagram for explaining an outline of processing for deriving inverse characteristics of a transmitter and a receiver in the first embodiment.

FIG. 2 is a diagram for explaining an outline of processing for deriving the inverse characteristics of the transmitter 10 and the receiver 50 in the first embodiment. In the first embodiment, the fact is used that filter coefficients ($h_1, \ldots, h_{16}$) obtained by the adaptive equalization unit 534 using an IQ signal and a phase conjugate signal thereof as input signals, and frequency offsets ($\exp(j\omega_x(n/T))$ and ($j\omega y(n/T)$)) include complete information of an IQ characteristic (corresponding to a frequency-dependent 4×4 matrix) of a reception system including crosstalk between lanes. A symbol interval is represented by n, and a period of the symbol is represented by T. Since this MIMO configuration is not a multistage configuration, a convergence problem that might be a conventional problem is also improved, and once an IQ characteristic function is obtained, there is no need to change the filter coefficient in the adaptive equalization unit 534 thereafter, so that calculation efficiency is improved as compared with a case where compensation is always performed dynamically.

First, signals (XI, XQ, YI, YQ) on which operations ($h_{RXI}$, $h_{RXQ}$, $h_{RYI}$, $h_{RYQ}$) for compensating for a frequency characteristic on the reception side and an operation ($h_{CD}^{-1}$) for compensating for wavelength dispersion of a transmission path are performed, and phase conjugate signals of the signals (XI, XQ, YI, YQ) are input to the adaptive equalization unit 534. The adaptive equalization unit 534 performs the adaptive equalization processing. The characteristic function derivation unit 538 receives an input of the filter coefficients ($h_1, \ldots, h_{16}$) obtained in the process of the adaptive equalization processing by the adaptive equalization unit 534 and the frequency offsets ($\exp(j\omega_x(n/T))$ and ($j\omega_y(n/T)$)). An inverse characteristic $H_T^{-1}(\omega)$ of the transmitter 10 and an inverse characteristic $H_R^{-1}(\omega)$ of the receiver 50 are calculated by calculation processing performed by the characteristic function derivation unit 538. Note that, the inverse characteristic $H_T^{-1}(\omega)$ is an aspect of a first inverse characteristic, and the inverse characteristic $H_R^{-1}(\omega)$ is an aspect of a second inverse characteristic.

Figure 3:
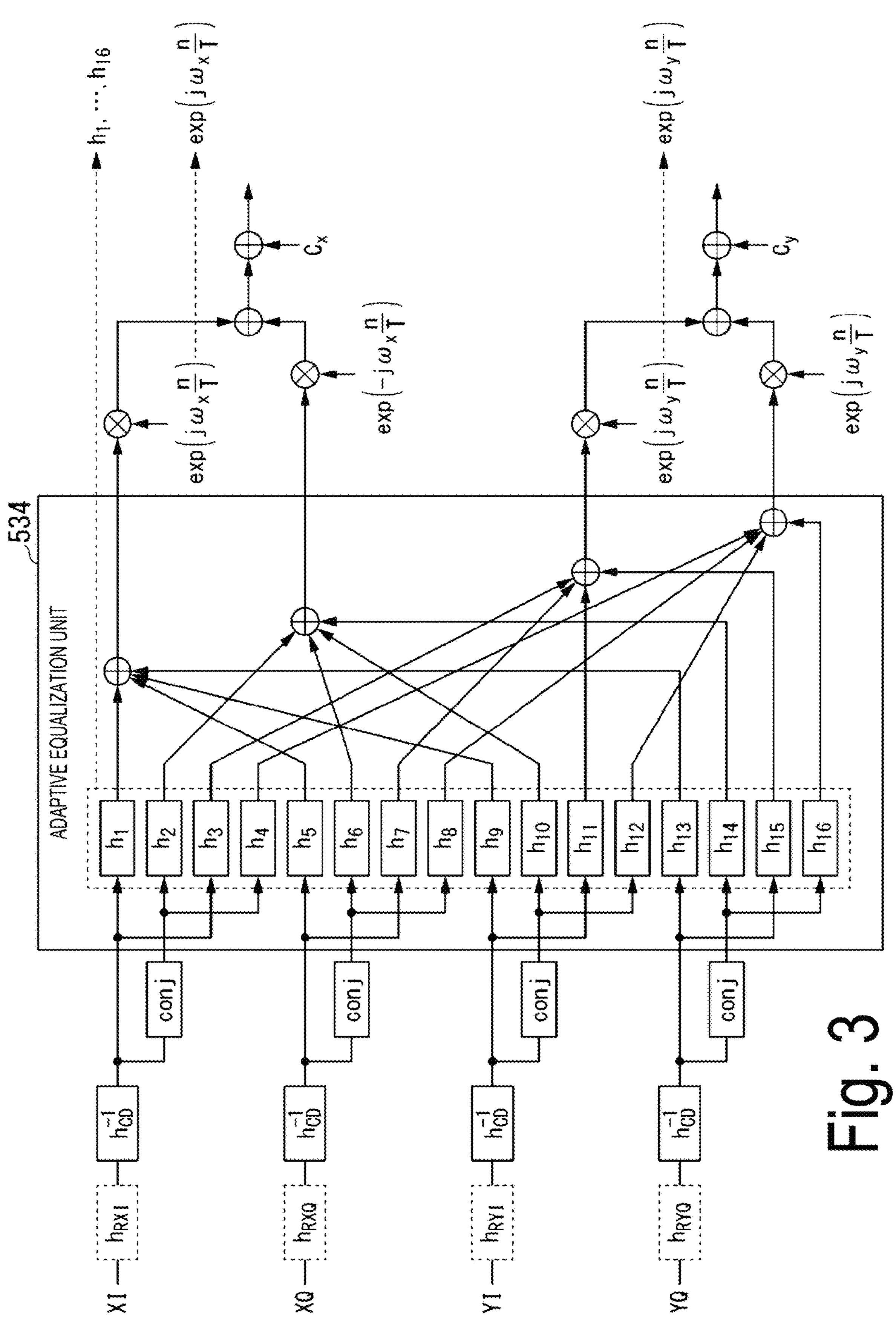
FIG. 3 is a diagram illustrating a configuration example of a demodulation digital signal processing unit including an adaptive equalization unit in the first embodiment.

FIG. 3 is a diagram illustrating a configuration example of a demodulation digital signal processing unit including the adaptive equalization unit 534 in the first embodiment. The demodulation digital signal processing unit includes the front end correction unit 532, the wavelength dispersion compensation unit 533, the adaptive equalization unit 534, and the frequency-and-phase offset compensation unit 535.

The demodulation digital signal processing unit receives an input of a real component XI and an imaginary component XQ of a reception complex signal of the X-polarized wave and a real component YI and an imaginary component YQ of a reception complex signal of the Y-polarized wave converted into the digital signal by the ADCs 531-1 to 531-4. The demodulation digital signal processing unit convolutes impulse responses ($h_{RXI}$, $h_{RXQ}$, $h_{RYI}$, $h_{RYQ}$) for compensating for the frequency characteristic of the receiver 50 and a complex impulse response $h_{CD}^{-1}$ for wavelength dispersion compensation into each of the real component XI, imaginary component XQ, real component YI, and imaginary component YQ. Therefore, two complex signals are output for each of an X-polarization component and a Y-polarization component.

Subsequently, the demodulation digital signal processing unit generates a phase conjugate of each of the two complex signals, and receives an input of eight signals of the real component XI, imaginary component XQ, real component YI, and imaginary component YQ, and the phase conjugates of them for each of the X-polarization component and the Y-polarization component. Therefore, in the adaptive equalization unit 534 of the receiver 50, IQ imbalance, skew between IQ lanes, bias deviations of the IQ modulators 141-1 and 141-2 and the like caused in the transmitter 10 can be dynamically compensated for in addition to impairments caused in the optical fiber transmission path 30 and the receiver 50, and the reception signal is improved in quality.

Specifically, the demodulation digital signal processing unit applies the impulse response $h_{RXI}$ for compensating for the frequency characteristic of the receiver 50 and the impulse response $h_{CD}^{-1}$ for wavelength dispersion compensation to the real component XI of the reception complex signal of the X-polarization component, and applies the impulse response $h_{RXQ}$ for compensating for the frequency characteristic of the receiver 50 and the impulse response $h_{CD}^{-1}$ for wavelength dispersion compensation to the imaginary component XQ of the reception complex signal of the X-polarization component.

Similarly, the demodulation digital signal processing unit applies the impulse response $h_{RYI}$ for compensating for the frequency characteristic of the receiver 50 and the impulse response $h_{CD}^{-1}$ for wavelength dispersion compensation to the real component YI of the reception complex signal of the Y-polarization component, and applies the impulse response $h_{RYQ}$ for compensating for the frequency characteristic of the receiver 50 and the impulse response $h_{CD}^{-1}$ for wavelength dispersion compensation to the imaginary component YQ of the reception complex signal of the Y-polarization component.

The demodulation digital signal processing unit branches each of the real component XI, the imaginary component XQ, the real component YI, and the imaginary component YQ into which the impulse response for compensating for the frequency characteristic of the receiver 50 and the impulse response for wavelength dispersion compensation are convoluted into four signals, directly inputs two signals out of the branched four signals to the adaptive equalization unit 534, and converts the remaining two signals into the phase conjugate signals to input to the adaptive equalization unit 534.

The adaptive equalization unit 534 adds the real component XI into which the impulse response $h_1$ is convoluted, the imaginary component XQ into which the impulse response $h_5$ is convoluted, the real component YI into which the impulse response $h_9$ is convoluted, and the imaginary component YQ into which the impulse response $h_{13}$ is convoluted. The addition signal is multiplied by the frequency offset $\exp(j\omega_x(n/T))$. Moreover, the adaptive equalization unit 534 adds a real component phase conjugate XI* into which the impulse response $h_2$ is convoluted, an imaginary component phase conjugate XQ into which the impulse response $h_6$ is convoluted, a real component phase conjugate YI* into which the impulse response $h_{10}$ is convoluted, and an imaginary component phase conjugate YQ* into which the impulse response $h_{14}$ is convoluted. The addition signal is multiplied by a frequency offset $\exp(-j\omega_x(n/T))$.

The demodulation digital signal processing unit adds the addition signal by which the frequency offset $\exp(j\omega_x(n/T))$ is multiplied and the addition signal by which the frequency offset $\exp(-j\omega_x(n/T))$ is multiplied, thereby obtaining the reception signal of the X-polarization component. The demodulation digital signal processing unit adds (or subtracts) a transmission data bias correction signal $C_X$ for canceling the bias deviation of the X-polarization component to (or from) the obtained reception signal of the X-polarization component, thereby obtaining a reception signal $X_{Rsig}(n)$ of the X-polarization component subjected to distortion correction. The demapping unit 536 outputs a reception signal $X\hat{}R_{sig}(n)$ obtained as a result of performing symbol determination on the reception signal $X_{Rsig}(n)$.

In contrast, the adaptive equalization unit 534 adds the real component XI into which the impulse response $h_3$ is convoluted, the imaginary component XQ into which the impulse response $h_7$ is convoluted, the real component YI into which the impulse response $h_{11}$ is convoluted, and the imaginary component YQ into which the impulse response his is convoluted. The addition signal is multiplied by a frequency offset $\exp(j\omega_y(n/T))$. Moreover, the adaptive equalization unit 534 adds a real component phase conjugate XI* into which the impulse response $h_4$ is convoluted, an imaginary component phase conjugate XQ into which the impulse response $h_{12}$ is convoluted, a real component phase conjugate YI* into which the impulse response $h_{16}$ is convoluted, and an imaginary component phase conjugate YQ* into which the impulse response $h_{14}$ is convoluted. The addition signal is multiplied by a frequency offset $\exp(-j\omega_y(n/T))$.

The demodulation digital signal processing unit adds the addition signal to which the frequency offset $\exp(j\omega_y(n/T))$ is applied and the addition signal to which the frequency offset $\exp(-j\omega_y(n/T)$ is applied, thereby obtaining the reception signal of the Y-polarization component. The demodulation digital signal processing unit adds (or subtracts) a transmission data bias correction signal Cy for canceling the bias deviation of the Y-polarization component to (or from) the obtained reception signal of the Y-polarization component, thereby obtaining a reception signal $Y_{Rsig}(n)$ of the X-polarization component subjected to distortion correction. The demapping unit 536 outputs a reception signal $Y\hat{}R_{sig}(n)$ obtained as a result of performing symbol determination on the reception signal $Y_{Rsig}(n)$.

Note that, the complex impulse response $h_{CD}^{-1}$ for wavelength dispersion compensation, the impulse responses $h_1$ to $h_{16}$, and the frequency offsets $\exp(j\omega_x(n/T))$, $\exp(-j\omega_x(n/T))$, $\exp(j\omega_y(n/T))$, and $\exp(-j\omega_y(n/T))$ are adaptively and dynamically changed. The receiver 50 acquires these values by any method.

Note that, the convolution of the impulse responses $h_{RXI}$, $h_{RXQ}$, $h_{RYI}$, and $h_{RYQ}$ corresponds to processing of the front end correction unit 532 illustrated in FIG. 1, and the convolution of the impulse response $h_{CD}^{-1}$ for wavelength dispersion compensation corresponds to processing of the wavelength dispersion compensation unit 533. Multiplication processing of the frequency offsets $\exp(j\omega_x(n/T))$, $\exp(-j\omega_x(n/T))$, $\exp(j\omega_y(n/T))$, and $\exp(-j\omega_y(n/T)$ on the addition signals corresponds to the function of the frequency-and-phase offset compensation unit 535.

The filter coefficients ($h_1, \ldots, h_{16}$) obtained in the processing of the adaptive equalization unit 534 in the demodulation digital signal processing unit and the frequency offsets ($\exp(j\omega_x(n/T))$ and $(j\omega_y(n/T))$) are output to the characteristic function derivation unit 538.

Next, a detailed principle of the above-described demodulation digital signal processing unit will be described.

First, a general variable a(x) is set to $(\sim)a(\omega)=a^*(-\omega)$ while paying attention to following Expression (1) when $FT(S_{i,in}(t))=S_{i,in}(\omega)$. Note that, (~) is attached above a.

[Math. 1]

$$FT\left(s_{i,in}^*\right) = s_{i,in}^*(-\omega) \qquad \text{Expression (1)}$$

In order to consider skew and crosstalk between the IQ lanes, a signal waveform is represented by 4×1 vector representation as following Expression (2).

[Math. 2]

$$s_{in}(\omega) = \begin{pmatrix} s_{x,in}(\omega) \\ \tilde{s}_{x,in}(\omega) \\ s_{y,in}(\omega) \\ \tilde{s}_{x,in}(\omega) \end{pmatrix},\ s_{out}(\omega) = \begin{pmatrix} s_{x,out}(\omega) \\ \tilde{s}_{x,out}(\omega) \\ s_{y,out}(\omega) \\ \tilde{s}_{x,out}(\omega) \end{pmatrix} \qquad \text{Expression (2)}$$

Herein, each vector before and after propagation can be expressed as following Expression (3).

[Math. 3]

$$s_{out}(\omega) = H_R(\omega)FT\big(H_{fR}(t)\ FT^{-1}\big(H_{CD}(\omega)H_{couple}(\omega)FT\big(H_{fT}(t)\,\big(FT^{-1}\big(H_T(\omega)s_{in}(\omega)\big)\big)\big)\big)\big) \qquad \text{Expression (3)}$$

Each sign in Expression (3) means the following content.

$H_R(\omega)$: 4×4 matrix representing the IQ characteristics of the transmitter 10 and the receiver 50 including the IQ skew, imbalance, and crosstalk between the lanes on the reception side $H_{fR}(t)$: a 4×4 matrix representing a frequency of local oscillation light of each receiver $H_{CD}(\omega)$: a 4×4 matrix representing an influence of the wavelength dispersion of the transmission path $H_{couple}(\omega)$: a 4×4 matrix representing channel crosstalk in the transmission path $H_{fT}(t)$: a 4×4 matrix representing a frequency of carrier light of each transmitter $H_T(\omega)$: a 4×4 matrix representing the IQ characteristics of the transmitter 10 and the receiver 50 including the IQ skew, imbalance, and crosstalk between the lanes on the transmission side It is possible to calculate $S_{in}(\omega)$ from $S_{out}(\omega)$ by calculating an inverse matrix of each sign in Expression (3). Following Expression (4) expresses $S_{in}(\omega)$.

[Math. 4]

$$s_{in}(\omega) = H_T^{-1}(\omega)FT\Big(H_{fT}^{-1}(t)FT^{-1}\Big(H_{couple}^{-1}(\omega)H_{CD}^{-1}(\omega)\Big(H_{CD}^{-1}(\omega)FT\Big(H_{fR}^{-1}(t)FT^{-1}\Big(H_R^{-1}(\omega)s_{out}(\omega)\Big)\Big)\Big)\Big)\Big) \quad \text{Expression (4)}$$

Each matrix of $H_R^{-1}(\omega)$, $H_{fR}^{-1}(t)$, $H_{CD}^{-1}(\omega)$, $H_{couple}^{-1}(\omega)$, $H_{fT}^{-1}(t)$, and $H_T^{-1}(t)$ in Expression (4) is expressed as following Expressions (5) to (10), respectively.

[Math. 5]

$$H_R^{-1}(\omega) := \begin{pmatrix} h_{R11}(\omega) & h_{R12}(\omega) & h_{R13}(\omega) & h_{R14}(\omega) \\ h_{R21}(\omega) & h_{R22}(\omega) & h_{R23}(\omega) & h_{R24}(\omega) \\ h_{R31}(\omega) & h_{R32}(\omega) & h_{R33}(\omega) & h_{R34}(\omega) \\ h_{R41}(\omega) & h_{R42}(\omega) & h_{R43}(\omega) & h_{R44}(\omega) \end{pmatrix} \quad \text{Expression (5)}$$

[Math. 6]

$$H_{fR}^{-1}(t) := \begin{pmatrix} \exp(i\omega_R t) & 0 & 0 & 0 \\ 0 & \exp(-i\omega_R t) & 0 & 0 \\ 0 & 0 & \exp(i\omega_R t) & 0 \\ 0 & 0 & 0 & \exp(-i\omega_R t) \end{pmatrix} \quad \text{Expression (6)}$$

-continued

[Math. 7]

$$H_{CD}^{-1}(\omega) := \begin{pmatrix} h_{CD}^{-1}(\omega) & 0 & 0 & 0 \\ 0 & \tilde{h}_{CD}^{-1}(\omega) & 0 & 0 \\ 0 & 0 & h_{CD}^{-1}(\omega) & 0 \\ 0 & 0 & 0 & \tilde{h}_{CD}^{-1}(\omega) \end{pmatrix} \quad \text{Expression (7)}$$

[Math. 8]

$$H_{couple}^{-1}(\omega) := \begin{pmatrix} h_{xx}^{-1}(\omega) & 0 & h_{xy}^{-1}(\omega) & 0 \\ 0 & \tilde{h}_{xx}^{-1}(\omega) & 0 & \tilde{h}_{xy}^{-1}(\omega) \\ h_{yx}^{-1}(\omega) & 0 & h_{yy}^{-1}(\omega) & 0 \\ 0 & \tilde{h}_{yx}^{-1}(\omega) & 0 & \tilde{h}_{yy}^{-1}(\omega) \end{pmatrix} \quad \text{Expression (8)}$$

[Math. 9]

$$H_{fT}^{-1}(t) := \begin{pmatrix} \exp(-i\omega_{T_x} t) & 0 & 0 & 0 \\ 0 & \exp(i\omega_{T_x} t) & 0 & 0 \\ 0 & 0 & \exp(-i\omega_{T_y} t) & 0 \\ 0 & 0 & 0 & \exp(i\omega_{T_y} t) \end{pmatrix} \quad \text{Expression (9)}$$

[Math. 10]

$$H_T^{-1}(\omega) = \begin{pmatrix} h_{T11}(\omega) & h_{T12}(\omega) & h_{T13}(\omega) & h_{T14}(\omega) \\ h_{T21}(\omega) & h_{T22}(\omega) & h_{T23}(\omega) & h_{T24}(\omega) \\ h_{T31}(\omega) & h_{T32}(\omega) & h_{T33}(\omega) & h_{T34}(\omega) \\ h_{T41}(\omega) & h_{T42}(\omega) & h_{T43}(\omega) & h_{T44}(\omega) \end{pmatrix} \quad \text{Expression (10)}$$

Herein, it is assumed that the local light on the reception side has the same frequency and phase fluctuation between the polarized waves. Supposing that $\Delta\omega_x = \omega_{Rx} - \omega_T$, and $\Delta\omega_y = \omega_{Ry} - \omega T$, $A(\omega)$, $B(\omega)$, and M are defined as Expressions (11) to (13), respectively. Note that, x of $\omega_{Rx}$ is a subscript of R, and y of $\omega_{Ry}$ is a subscript of R.

[Math. 11]

$$A(\omega) = \begin{pmatrix} h_{T11}(\omega - \Delta\omega_x) & h_{T12}(\omega + \Delta\omega_x) & h_{T13}(\omega - \Delta\omega_y) & h_{T14}(\omega + \omega_y) \\ h_{T21}(\omega - \Delta\omega_x) & h_{T22}(\omega + \Delta\omega_x) & h_{T23}(\omega - \Delta\omega_y) & h_{T24}(\omega + \omega_y) \\ h_{T31}(\omega - \Delta\omega_x) & h_{T32}(\omega + \Delta\omega_x) & h_{T33}(\omega - \Delta\omega_y) & h_{T34}(\omega + \omega_y) \\ h_{T41}(\omega - \Delta\omega_x) & h_{T42}(\omega + \Delta\omega_x) & h_{T43}(\omega - \Delta\omega_y) & h_{T44}(\omega + \omega_y) \end{pmatrix} \times \quad \text{Expression (11)}$$

$$\begin{pmatrix} h_{xx}^{-1}(\omega - \omega_{R_x}) & 0 & h_{xy}^{-1}(\omega - \omega_{R_x}) & 0 \\ 0 & 0 & 0 & 0 \\ h_{yx}^{-1}(\omega - \omega_{R_y}) & 0 & h_{yy}^{-1}(\omega - \omega_{R_y}) & 0 \\ 0 & 0 & 0 & 0 \end{pmatrix} \times \begin{pmatrix} h_{R11}(\omega) & h_{R12}(\omega) & h_{R13}(\omega) & h_{R14}(\omega) \\ h_{R21}(\omega) & h_{R22}(\omega) & h_{R23}(\omega) & h_{R24}(\omega) \\ h_{R31}(\omega) & h_{R32}(\omega) & h_{R33}(\omega) & h_{R34}(\omega) \\ h_{R41}(\omega) & h_{R42}(\omega) & h_{R43}(\omega) & h_{R44}(\omega) \end{pmatrix}$$

[Math. 12]

$$B(\omega) =$$

$$\begin{pmatrix} h_{T11}(\omega - \Delta\omega_x) & h_{T12}(\omega + \Delta\omega_x) & h_{T13}(\omega - \Delta\omega_y) & h_{T14}(\omega + \omega_y) \\ h_{T21}(\omega - \Delta\omega_x) & h_{T22}(\omega + \Delta\omega_x) & h_{T23}(\omega - \Delta\omega_y) & h_{T24}(\omega + \omega_y) \\ h_{T31}(\omega - \Delta\omega_x) & h_{T32}(\omega + \Delta\omega_x) & h_{T33}(\omega - \Delta\omega_y) & h_{T34}(\omega + \omega_y) \\ h_{T41}(\omega - \Delta\omega_x) & h_{T42}(\omega + \Delta\omega_x) & h_{T43}(\omega - \Delta\omega_y) & h_{T44}(\omega + \omega_y) \end{pmatrix} \times \quad \text{Expression (12)}$$

$$\begin{pmatrix} 0 & 0 & 0 & 0 \\ 0 & \tilde{h}_{xx}^{-1}(\omega - \omega_{R_x}) & 0 & \tilde{h}_{xy}^{-1}(\omega - \omega_{R_x}) \\ 0 & 0 & 0 & 0 \\ 0 & \tilde{h}_{yx}^{-1}(\omega - \omega_{R_y}) & 0 & \tilde{h}_{yy}^{-1}(\omega - \omega_{R_y}) \end{pmatrix} \times \begin{pmatrix} h_{R11}(\omega) & h_{R12}(\omega) & h_{R13}(\omega) & h_{R14}(\omega) \\ h_{R21}(\omega) & h_{R22}(\omega) & h_{R23}(\omega) & h_{R24}(\omega) \\ h_{R31}(\omega) & h_{R32}(\omega) & h_{R33}(\omega) & h_{R34}(\omega) \\ h_{R41}(\omega) & h_{R42}(\omega) & h_{R43}(\omega) & h_{R44}(\omega) \end{pmatrix}$$

-continued

[Math. 13]

$$M=\begin{pmatrix}1 & i & 0 & 0\\ 1 & -i & 0 & 0\\ 0 & 0 & 1 & i\\ 0 & 0 & 1 & -i\end{pmatrix}\qquad \text{Expression (13)}$$

In this case, $S_{in}(\omega)$ is expressed as following Expression (14).

[Math. 14]

$$s_{in}(\omega)=FT\begin{pmatrix}\exp(i\Delta\omega_x t) & 0 & 0 & 0\\ 0 & \exp(i\Delta\omega_x t) & 0 & 0\\ 0 & 0 & \exp(i\Delta\omega_y t) & 0\\ 0 & 0 & 0 & \exp(i\Delta\omega_y t)\end{pmatrix} FT^{-1}A(\omega)M\begin{pmatrix}h_{CD}^{-1}(\omega)\mathrm{Re}\,(s_{x,out}(\omega))\\ h_{CD}^{-1}(\omega)\mathrm{Im}\,(s_{x,out}(\omega))\\ h_{CD}^{-1}(\omega)\mathrm{Re}\,(s_{y,out}(\omega))\\ h_{CD}^{-1}(\omega)\mathrm{Im}\,(s_{x,out}(\omega))\end{pmatrix}+$$
$$FT\begin{pmatrix}\exp(-i\Delta\omega_x t) & 0 & 0 & 0\\ 0 & \exp(-i\Delta\omega_x t) & 0 & 0\\ 0 & 0 & \exp(-i\Delta\omega_y t) & 0\\ 0 & 0 & 0 & \exp(-i\Delta\omega_y t)\end{pmatrix} FT^{-1}B(\omega)M\begin{pmatrix}[h_{CD}^{-1}(\omega)\mathrm{Re}\,(s_{x,out}(\omega))]^*\\ [h_{CD}^{-1}(\omega)\mathrm{Im}\,(s_{x,out}(\omega))]^*\\ [h_{CD}^{-1}(\omega)\mathrm{Re}\,(s_{y,out}(\omega))]^*\\ [h_{CD}^{-1}(\omega)\mathrm{Im}\,(s_{x,out}(\omega))]^*\end{pmatrix}\qquad \text{Expression (14)}$$

When Expression (14) is converted into a time domain, this is expressed as Expression (15).

[Math. 15]

$$s_{in}(t)=\begin{pmatrix}\exp(i\Delta\omega_x t) & 0 & 0 & 0\\ 0 & \exp(i\Delta\omega_x t) & 0 & 0\\ 0 & 0 & \exp(i\Delta\omega_y t) & 0\\ 0 & 0 & 0 & \exp(i\Delta\omega_y t)\end{pmatrix}\left[A(\omega)M*\begin{pmatrix}h_{CD}^{-1}(t)*\mathrm{Re}\,(s_{x,out}(t))\\ h_{CD}^{-1}(t)*\mathrm{Im}\,(s_{x,out}(t))\\ h_{CD}^{-1}(t)*\mathrm{Re}\,(s_{y,out}(t))\\ h_{CD}^{-1}(t)*\mathrm{Im}\,(s_{x,out}(t))\end{pmatrix}\right]+$$
$$\begin{pmatrix}\exp(-i\Delta\omega_x t) & 0 & 0 & 0\\ 0 & \exp(-i\Delta\omega_x t) & 0 & 0\\ 0 & 0 & \exp(-i\Delta\omega_y t) & 0\\ 0 & 0 & 0 & \exp(-i\Delta\omega_y t)\end{pmatrix}\left[B(t)M*\begin{pmatrix}[h_{CD}^{-1}(t)\mathrm{Re}\,(s_{x,out}(t))]^*\\ [h_{CD}^{-1}(t)\mathrm{Im}\,(s_{x,out}(t))]^*\\ [h_{CD}^{-1}(t)\mathrm{Re}\,(s_{y,out}(t))]^*\\ [h_{CD}^{-1}(t)\mathrm{Im}\,(s_{x,out}(t))]^*\end{pmatrix}\right]\qquad \text{Expression (15)}$$

According to Expression (15), in order to compensate for distortion occurring during the transmission, it is sufficient to perform wavelength dispersion compensation on each of a real part and an imaginary part of the signal of each polarized wave, then convolute an appropriate function (for example, corresponding to A(t)M and B(t)M based on Expressions (11) to (13) above) in a 4×4 matrix format into the set of four signals or their complex conjugate signals, and multiply by a term for correcting the frequency offset of the local oscillation light. One of adaptive filters that perform equalization on this principle is an 8×2 MIMO configuration illustrated in FIG. 3.

In the 8×2 MIMO configuration, odd-numbered rows of A(t)M and B(t)M are adaptively obtained. That is, $h_1$, $h_3$, . . . , $h_{15}$ correspond to elements in the odd-numbered rows of A(t)M, and $h_2$, $h_4$, . . . , $h_{16}$ correspond to elements in the odd-numbered rows of B(t)M. Under the condition that complex conjugate of a component of a (2i+1)-th row of $S_{in}(\omega)$ is equal to a component of a 2i-th row, components of even-numbered rows of A(ω) and B(ω) are obtained from components of the odd-numbered rows of the other, and A(ω) and B(ω) are obtained as Expressions (16) and (17) from Fourier transform of the filter coefficients $h_1$ to $h_{16}$ of the 8×2 MIMO configuration.

[Math. 16]

$$A(\omega) = M^{-1}\begin{pmatrix} h_1(\omega) & h_5(\omega) & h_9(\omega) & h_{13}(\omega) \\ \tilde{h}_2(\omega) & \tilde{h}_6(\omega) & \tilde{h}_{10}(\omega) & \tilde{h}_{14}(\omega) \\ h_3(\omega) & h_7(\omega) & h_{11}(\omega) & h_{15}(\omega) \\ \tilde{h}_4(\omega) & \tilde{h}_8(\omega) & \tilde{h}_{12}(\omega) & \tilde{h}_{16}(\omega) \end{pmatrix} \quad \text{Expression (16)}$$

[Math. 17]

$$B(\omega) = M^{-1}\begin{pmatrix} h_2(\omega) & h_6(\omega) & h_{10}(\omega) & h_{14}(\omega) \\ \tilde{h}_1(\omega) & \tilde{h}_5(\omega) & \tilde{h}_9(\omega) & \tilde{h}_{13}(\omega) \\ h_4(\omega) & h_8(\omega) & h_{12}(\omega) & h_{16}(\omega) \\ \tilde{h}_3(\omega) & \tilde{h}_7(\omega) & \tilde{h}_{11}(\omega) & \tilde{h}_{15}(\omega) \end{pmatrix} \quad \text{Expression (17)}$$

Figure 4:
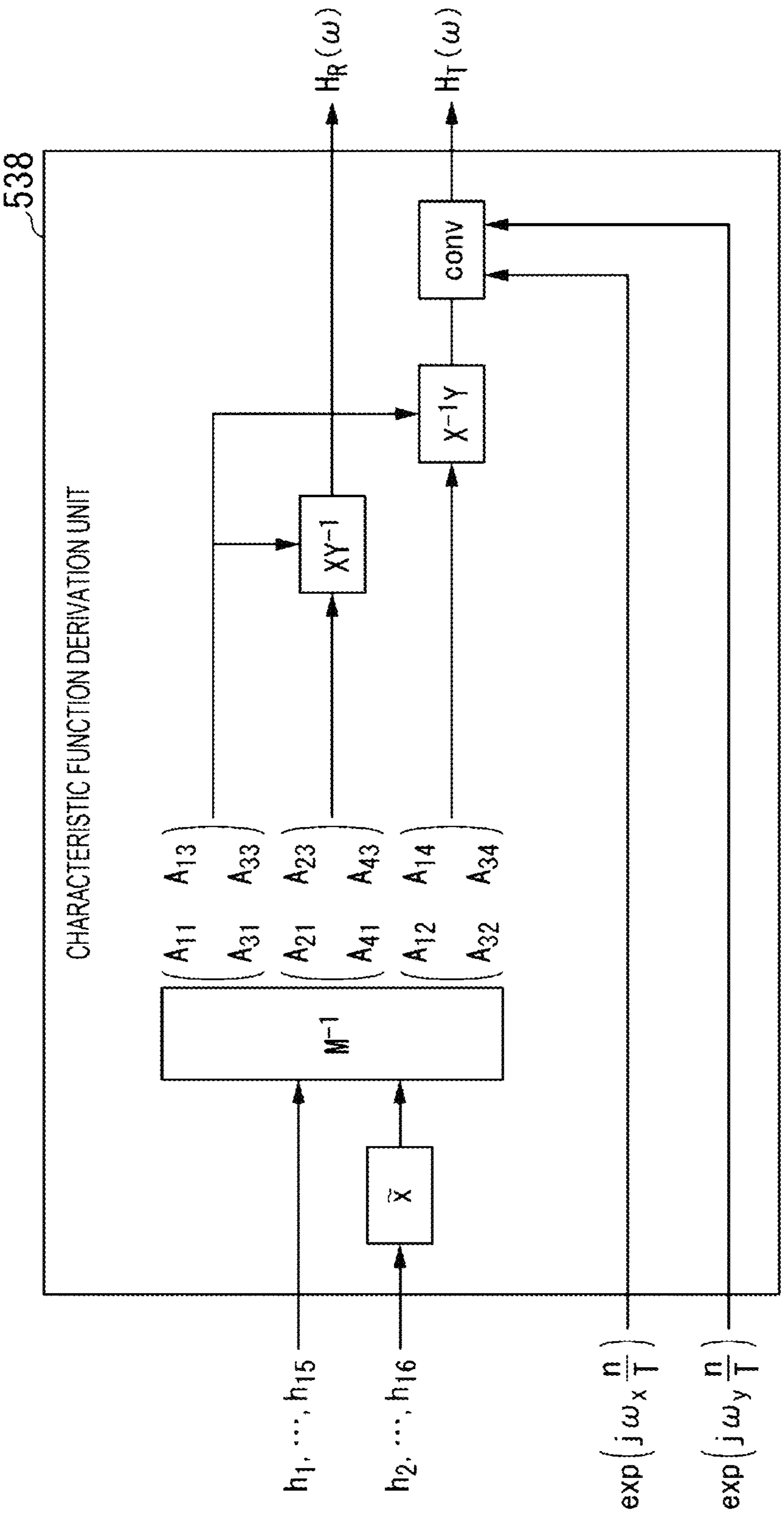
FIG. 4 is a diagram illustrating a configuration example of a characteristic function derivation unit in the first embodiment.

In the first embodiment, the characteristic function derivation unit 538 illustrated in FIG. 4 derives the characteristic $H_T(\omega)$ of the transmitter 10 and the characteristic $H_R(\omega)$ of the receiver 50 on the basis of A(ω). As for $H_T(\omega)$ and $H_R(\omega)$, a complex conjugate of a component of a (2i+1)-th row of an input/output vector is equal to a component of a 2i-th row with respect to a value that can be taken by each element, and even if a matrix representing any polarization rotation and phase rotation is multiplied on the transmission path side, this can be regarded as the same transceiver characteristic, so that $H_T(\omega)$ and $H_R(\omega)$ can reduce the degrees of freedom from 16 complex numbers to 4 complex numbers, and can be regarded as Expressions (18) and (19).

[Math. 18]

$$H_T^{-1}(\omega) = \begin{pmatrix} 1 & \tilde{h}_{T21}(\omega) & 0 & \tilde{h}_{T23}(\omega) \\ h_{T21}(\omega) & 1 & h_{T23}(\omega) & 0 \\ 0 & \tilde{h}_{T41}(\omega) & 1 & \tilde{h}_{T43}(\omega) \\ h_{T41}(\omega) & 0 & h_{T43}(\omega) & 1 \end{pmatrix} \quad \text{Expression (18)}$$

[Math. 19]

$$H_R^{-1}(\omega) = \begin{pmatrix} 1 & h_{R12}(\omega) & 0 & h_{R14}(\omega) \\ \tilde{h}_{R12}(\omega) & 1 & \tilde{h}_{R14}(\omega) & 0 \\ 0 & h_{R32}(\omega) & 1 & h_{R34}(\omega) \\ \tilde{h}_{R32}(\omega) & 0 & \tilde{h}_{R34}(\omega) & 1 \end{pmatrix} \quad \text{Expression (19)}$$

Herein, from the definition of A, A(ω) is expressed as following Expression (20).

[Math. 20]

$$A(\omega) = \begin{pmatrix} 1 & \tilde{h}_{T21}(\omega-\Delta\omega_x) & 0 & \tilde{h}_{T23}(\omega-\Delta\omega_y) \\ h_{T21}(\omega-\Delta\omega_x) & 1 & h_{T23}(\omega-\Delta\omega_y) & 0 \\ 0 & \tilde{h}_{T41}(\omega-\Delta\omega_x) & 1 & \tilde{h}_{T43}(\omega-\Delta\omega_y) \\ h_{T41}(\omega-\Delta\omega_x) & 0 & h_{T43}(\omega-\Delta\omega_y) & 1 \end{pmatrix} \times \quad \text{Expression (20)}$$

$$\begin{pmatrix} h_{xx}^{-1}(\omega-\omega_{R_x}) & 0 & h_{xy}^{-1}(\omega-\omega_{R_x}) & 0 \\ 0 & 0 & 0 & 0 \\ h_{yx}^{-1}(\omega-\omega_{R_y}) & 0 & h_{yy}^{-1}(\omega-\omega_{R_y}) & 0 \\ 0 & 0 & 0 & 0 \end{pmatrix}\begin{pmatrix} 1 & h_{R12}(\omega) & 0 & h_{R14}(\omega) \\ \tilde{h}_{R12}(\omega) & 1 & \tilde{h}_{R14}(\omega) & 0 \\ 0 & h_{R32}(\omega) & 1 & h_{R34}(\omega) \\ \tilde{h}_{R32}(\omega) & 0 & \tilde{h}_{R34}(\omega) & 1 \end{pmatrix}$$

As a result, A(ω) is expressed as following Expression (21).

[Math. 21]

$$A(\omega) = \begin{pmatrix} h_{xx}^{-1} & h_{xx}^{-1}h_{R12} + h_{xy}^{-1}h_{R32} & h_{xy}^{-1} & h_{xx}^{-1}h_{R14} + h_{xy}^{-1}h_{R34} \\ h_{xx}^{-1}h_{T21} + h_{yx}^{-1}h_{T23} & - & h_{xy}^{-1}h_{T21} + h_{yy}^{-1}h_{T23} & - \\ h_{yx}^{-1} & h_{yx}^{-1}h_{R12} + h_{yy}^{-1}h_{R32} & h_{yy}^{-1} & h_{yx}^{-1}h_{R12} + h_{yy}^{-1}h_{R32} \\ h_{xx}^{-1}h_{T41} + h_{yx}^{-1}h_{T43} & - & h_{xy}^{-1}h_{T41} + h_{yy}^{-1}h_{T43} & - \end{pmatrix} \quad \text{Expression (21)}$$

When A(ω) is obtained as described above and A(ω) is placed as following Expression (22), a relationship of Expression (23) is derived on the basis of Expressions (21) and (22).

[Math. 22]

$$A(\omega)=\begin{pmatrix}A_{11}&A_{12}&A_{13}&A_{14}\\A_{21}&A_{22}&A_{23}&A_{24}\\A_{31}&A_{32}&A_{33}&A_{34}\\A_{41}&A_{42}&A_{43}&A_{44}\end{pmatrix}\qquad\text{Expression (22)}$$

[Math. 23]

$$\begin{pmatrix}h_{xx}^{-1}&h_{xy}^{-1}\\h_{yx}^{-1}&h_{yy}^{-1}\end{pmatrix}=\begin{pmatrix}A_{11}&A_{13}\\A_{31}&A_{33}\end{pmatrix}\qquad\text{Expression (23)}$$

Moreover, a relationship of Expression (24) is also derived on the basis of Expressions (21) and (22).

[Math. 24]

$$\begin{pmatrix}A_{21}&A_{23}\\A_{41}&A_{43}\end{pmatrix}=\begin{pmatrix}h_{T21}&h_{T23}\\h_{T41}&h_{T43}\end{pmatrix}\begin{pmatrix}h_{xx}^{-1}&h_{xy}^{-1}\\h_{yx}^{-1}&h_{yy}^{-1}\end{pmatrix}\qquad\text{Expression (24)}$$

Expression (25) is derived on the basis of Expressions (24) and (23).

[Math. 25]

$$\begin{pmatrix}h_{T21}&h_{T23}\\h_{T41}&h_{T43}\end{pmatrix}=\begin{pmatrix}A_{21}&A_{23}\\A_{41}&A_{43}\end{pmatrix}\begin{pmatrix}A_{11}&A_{13}\\A_{31}&A_{33}\end{pmatrix}^{-1}\qquad\text{Expression (25)}$$

Moreover, a relationship of Expression (26) is also derived on the basis of Expressions (21) and (22).

[Math. 26]

$$\begin{pmatrix}A_{12}&A_{14}\\A_{32}&A_{34}\end{pmatrix}=\begin{pmatrix}h_{xx}^{-1}&h_{xy}^{-1}\\h_{yx}^{-1}&h_{yy}^{-1}\end{pmatrix}\begin{pmatrix}h_{R12}&h_{R14}\\h_{R32}&h_{R34}\end{pmatrix}\qquad\text{Expression (26)}$$

Expression (27) is derived on the basis of Expressions (26) and (23).

[Math. 27]

$$\begin{pmatrix}h_{R12}&h_{R14}\\h_{R32}&h_{R34}\end{pmatrix}=\begin{pmatrix}A_{11}&A_{13}\\A_{31}&A_{33}\end{pmatrix}^{-1}\begin{pmatrix}A_{12}&A_{14}\\A_{32}&A_{34}\end{pmatrix}\qquad\text{Expression (27)}$$

Each component is calculated by performing the calculation as described above. Although factors of $\Delta\omega_x$ and $\Delta\omega_y$ remain in each element of obtained $H_T^{-1}$, since the frequency offset of the local oscillation light is obtained at the time of adaptive equalization, it is possible to perform correction by performing convolution operation of this value. The characteristic function derivation unit 538 derives the inverse characteristic $H_T^{-1}$ (ω) and the inverse characteristic $H_R^{-1}(\omega)$ using the expressions obtained as described above. Specifically, the characteristic function derivation unit 538 derives the inverse characteristic $H_T^{-1}$ (ω) by applying each matrix element of Expression (25) to Expression (18), and derives the inverse characteristic $H_R^{-1}$ (ω) by applying each matrix element of Expression (27) to Expression (19).

Figure 5:
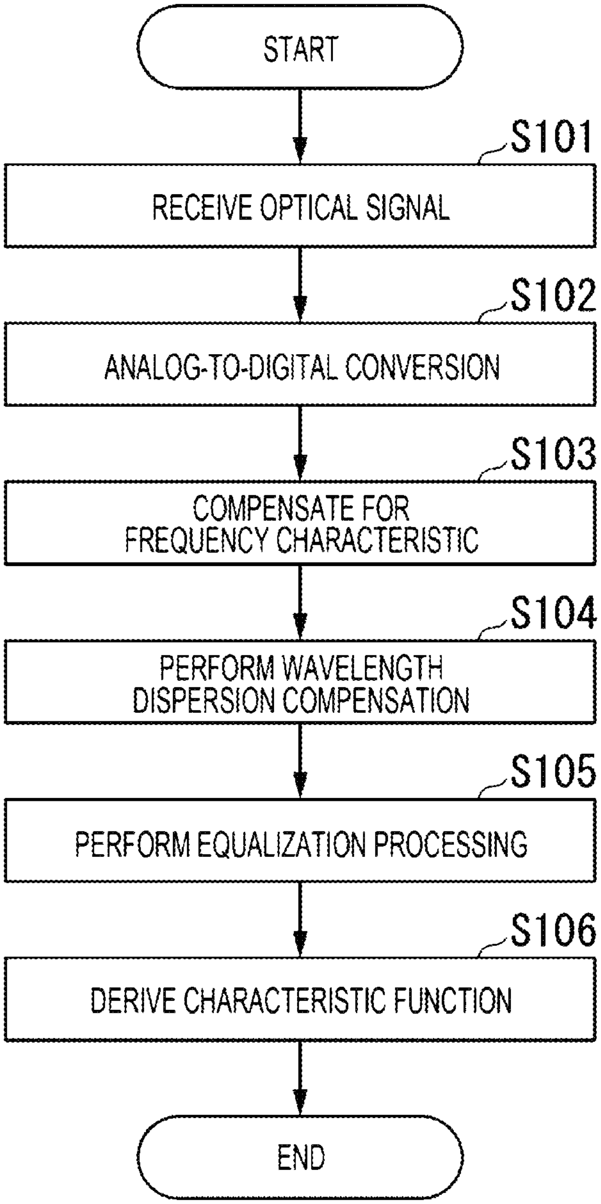
FIG. 5 is a flowchart illustrating a flow of processing of a receiver in the first embodiment.

FIG. 5 is a flowchart illustrating a flow of processing of the receiver 50 in the first embodiment.

The optical front end 520 receives the optical signal (polarization multiplexed signal) transmitted through the optical fiber transmission path 30 (step S101). Each functional unit in the optical front end 520 performs, on the received optical signal, polarization separation by the polarization separation unit 521, extraction of the I component and the Q component of the X-polarized wave by the optical 90-degree hybrid coupler 522-1, extraction of the I component and the Q component of the Y-polarized wave by the optical 90-degree hybrid coupler 522-2, conversion into the electric signal, and amplification of the electric signal.

The ADC 531-*i* converts the electric signal output from the amplifier 524-*i* from the analog signal to the digital signal (step S102). The front end correction unit 532 uses each input signal to generate the reception signal subjected to the compensation for the frequency characteristic in the optical front end 520 (step S103). The wavelength dispersion compensation unit 533 performs the wavelength dispersion compensation on the electric signal output from the front end correction unit 532 (step S104).

The adaptive equalization unit 534 performs the equalization processing on the reception signal output from the wavelength dispersion compensation unit 533 (step S105). The adaptive equalization unit 534 outputs the filter coefficient obtained at the time of the equalization processing and the frequency offset to the characteristic function derivation unit 538. Note that, in FIG. 5, the description of the frequency-and-phase offset compensation unit 535 and after that will be omitted.

The characteristic function derivation unit 538 derives the inverse characteristics of the transmitter 10 and the receiver 50 on the basis of the filter coefficient output from the adaptive equalization unit 534 and the frequency offset (step S106).

According to the receiver 50 configured as described above, the inverse characteristic $H_T^{-1}(\omega)$ representing the inverse characteristic of the transmitter 10 and the inverse characteristic $H_R^{-1}(\omega)$ representing the inverse characteristic of the receiver 50 are calculated on the basis of the adaptive equalization unit 534 that performs the equalization processing on the input signal using the polarization multiplexed reception signal and the phase conjugate signal of the polarization multiplexed reception signal as the input signals, the filter coefficient obtained at the time of the equalization processing performed by the adaptive equalization unit 534, and the frequency offset. As described above, by analyzing the polarization multiplexed reception signal in the receiver 50, it is possible to estimate the characteristic of the transmitter 10 and the characteristic of the receiver 50 including the IQ crosstalk between the lanes beyond polarization, core, and mode. Therefore, it is possible to implement a highly efficient and highly reliable optical communication system by inputting an inverse characteristic function to the equivalent filters of the transmitter 10 and the receiver 50 to correct communication distortion.

Modification Example of First Embodiment

In the above-described embodiment, the configuration in which the signal input to the adaptive equalization unit 534 is the set of the IQ signal and the phase conjugate signal of the IQ signal has been described. As the signal input to the adaptive equalization unit 534, a set of signals mathematically equivalent to the set of the IQ signal and the phase conjugate signal of the IQ signal may be used. For example, a set of a total of four signals including signals obtained by performing wavelength dispersion compensation on a complex signal and a phase conjugate signal thereof, and phase conjugate signals of the two signals is associated with the set of the IQ signal and the phase conjugate signal of the IQ signal by orthogonal linear conversion. Therefore, the set of four signals described above may be input to the adaptive equalization unit 534 as the input signal. Even in such a configuration, it is possible to measure the characteristic of the transmitter 10 and the characteristic of the receiver 50. At the time of measurement, the filter coefficient may be converted using inverse conversion of the set used as the input signal and the set of the IQ signal and the phase conjugate signal thereof.

Second Embodiment

Although only polarization division multiplexing is considered in the first embodiment, in a second embodiment, a configuration of extending to any multiplex number N (N≥2) obtained by combining space division multiplexing and wavelength division multiplexing in addition to the polarization division multiplexing will be described. A basic system configuration of a digital coherent optical transmission system of the second embodiment is different from the digital coherent optical transmission system 1 illustrated in FIG. 1 in a following configuration.

A transmitter 10 further includes as many transmission units 100 as the number of channels of wavelength division multiplexing (WDM). The transmission units 100 output optical signals of different wavelengths. A WDM multiplexer, an optical fiber transmission path 30, and a WDM demultiplexer are provided between the transmitter 10 and a receiver 50. The WDM multiplexer multiplexes optical signals output by the transmission units 100, and outputs the same to the optical fiber transmission path 30. The WDM demultiplexer demultiplexes the optical signal transmitted through the optical fiber transmission path 30 by wavelength. The receiver 50 further includes as many reception units 500 as the number of channels of the WDM. Each reception unit 500 receives the optical signal demultiplexed by a WDM demultiplexer 40. Wavelengths of the optical signals received by the reception units 500 are different from each other. The configuration described heretofore is that in a case where the polarization division multiplexing and the wavelength division multiplexing are combined.

In a case of further combining the spatial division multiplexing, a point that the transmitter 10 transmits a spatially N multiplexed polarization multiplexed signal, a point that a device for spatial multiplexing/demultiplexing such as a mode multiplexer/demultiplexer is inserted in addition to the WDM multiplexer and the WDM demultiplexer, and a point that, in the receiver 50, as many optical front ends 520 as spatial multiplex number are arranged, the number of inputs of a MIMO equalizer (demodulation digital signal processing unit) and the number of complex impulse responses increase to $16N^2$, and N sets of polarization multiplexed signals are demodulated are added. The spatially N multiplexed polarization multiplexed signal is transmitted to the receiver 50 by, for example, a multi-core fiber a multi-mode or the like.

Figure 6:
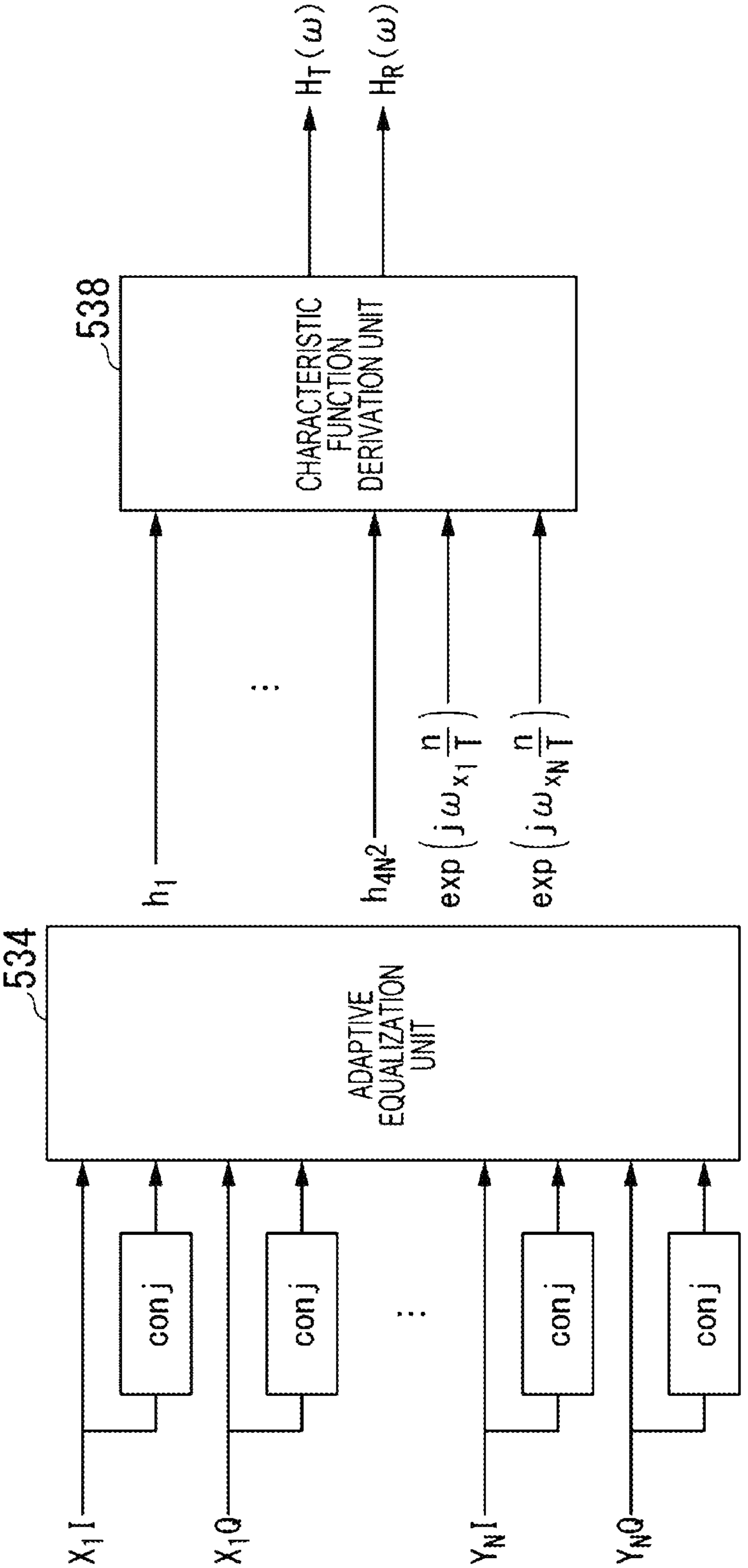
FIG. 6 is a diagram for explaining an outline of processing for deriving inverse characteristics of a transmitter and a receiver in a second embodiment.

FIG. 6 is a diagram for explaining an outline of processing for deriving inverse characteristics of the transmitter 10 and the receiver 50 in the second embodiment. An adaptive equalization unit 534 performs adaptive equalization processing on 2N inputs of $X_1I$, $X_1Q$, . . . , $X_NI$, and $X_NQ$. The characteristic function derivation unit 538 receives an input of filter coefficients $h_1$, . . . , and $h_{4(N^2)}$ obtained in the process of the adaptive equalization processing by the adaptive equalization unit 534 and $\exp(j\omega_{x1}(n/T))$, . . . , and $\exp(j\omega_{xN}(n/T))$. Note that, herein, 1 in $\omega_{x1}$ is a subscript of x, and N in $\omega_{xN}$ is a subscript of x. An inverse characteristic $H_T^{-1}(\omega)$ of the transmitter 10 and an inverse characteristic $H_R^{-1}(\omega)$ of the receiver 50 are calculated by calculation processing performed by the characteristic function derivation unit 538.

Figure 7:
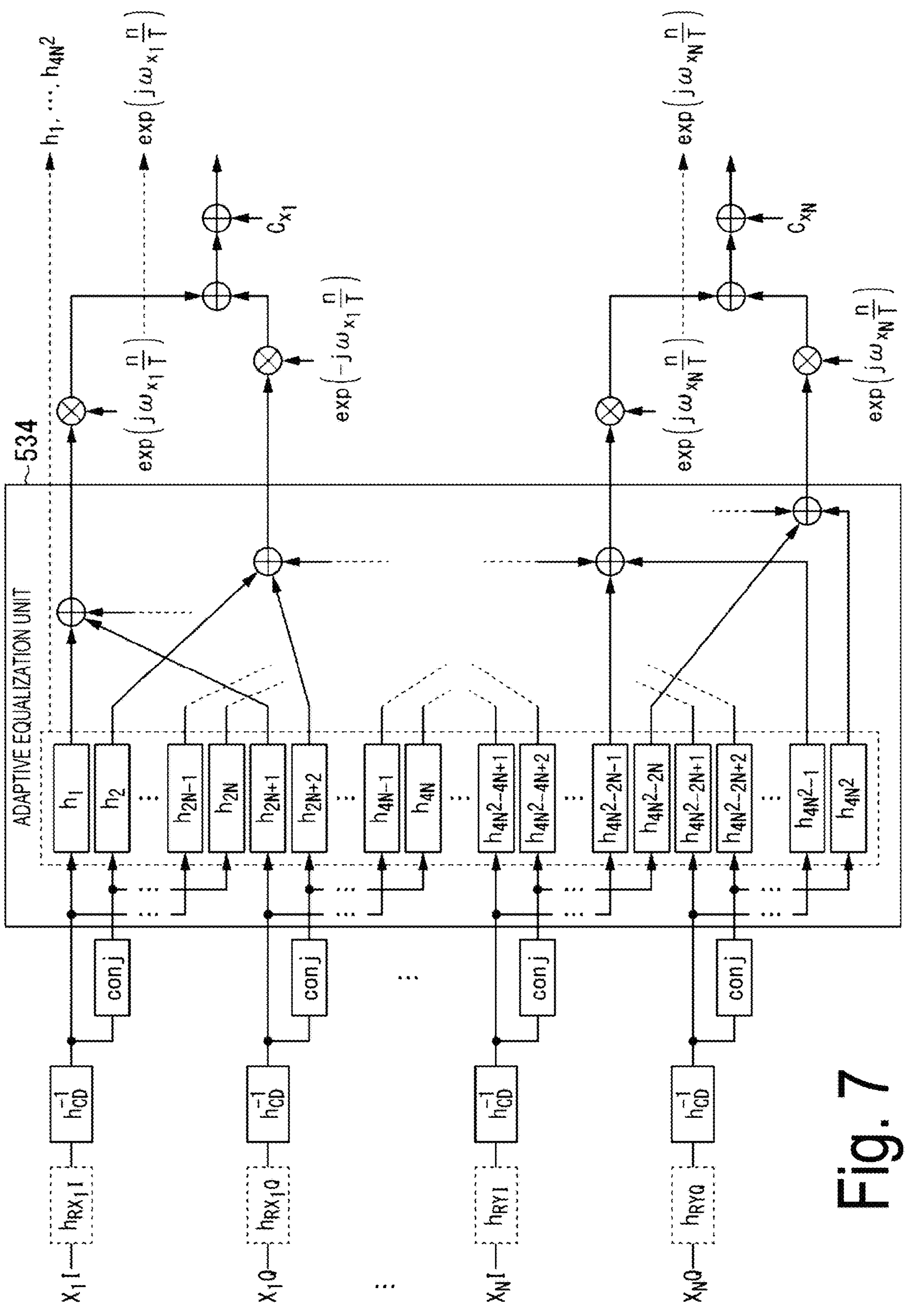
FIG. 7 is a diagram illustrating a configuration example of a demodulation digital signal processing unit including an adaptive equalization unit in the second embodiment.

FIG. 7 is a diagram illustrating a configuration example of a demodulation digital signal processing unit including the adaptive equalization unit 534 in the second embodiment. FIG. 7 illustrates a configuration of the adaptive equalization unit 534 in a case where 8×2 MIMO is extended a case of the multiplex number N to obtain a (4N×N) MIMO configuration.

The demodulation digital signal processing unit sets an I component signal of an X-polarization component of a k-th (k is an integer of 1 or larger and N or smaller) polarization multiplexed reception signal output by the optical front end 520 as a real component $X_kI$, a Q component signal as an imaginary component $X_kQ$, an I component signal of a Y-polarization component as a real component $Y_kI$, and a Q component signal as an imaginary component $Y_kQ$. The demodulation digital signal processing unit convolutes an impulse response for compensating for a frequency characteristic of the receiver and a complex impulse response for wavelength dispersion compensation into each of the real component $X_kI$, imaginary component $X_kQ$, real component $Y_kI$, and imaginary component $Y_kQ$ of the k-th polarization multiplexed reception signal according to each component.

The demodulation digital signal processing unit branches each of the convoluted real component $X_kI$, imaginary component $X_kQ$, real component $Y_kI$, and imaginary component $Y_kQ$ into 4N signals. The demodulation digital signal processing unit directly inputs 2N signals out of the branched 4N signals into the adaptive equalization unit 534, and converts the remaining 2N signals into the phase conjugate signals to input to the adaptive equalization unit 534.

Phase conjugates of the real component $X_kI$, the imaginary component $X_kQ$, the real component $Y_kI$, and the imaginary component $Y_kQ$ are set as a real component phase conjugate $X_kI^*$, an imaginary component phase conjugate $X_kQ^*$, a real component phase conjugate $Y_kI^*$, and an imaginary component phase conjugate $Y_kQ^*$, respectively. Each of 2N sets including the real component $X_kI$, the imaginary component $X_kQ$, the real component $Y_kI$, the imaginary component $Y_kQ$, the real component phase conjugate $X_kI^*$, the imaginary component phase conjugate $X_kQ^*$, the real component phase conjugate $Y_kI^*$, and the imaginary component phase conjugate $Y_kQ^*$ corresponds to the X-polarization component and Y-polarization component of N polarization multiplexed reception signals.

The adaptive equalization unit 534 convolutes the impulse response into each of 2N real components $X_1I$ to $X_NI$, imaginary components $X_1Q$ to $X_NQ$, real components $Y_1I$ to $Y_NI$, imaginary components $Y_1Q$ to $Y_NQ$, real component phase conjugates $X_1I^*$ to $X_NI^*$, imaginary component phase conjugates $X_1Q^*$ to $X_NQ^*$, real component phase conjugates $Y_1I^*$ to $Y_NI^*$, and imaginary component phase conjugates $Y_1Q^*$ to $Y_NQ^*$. The adaptive equalization unit 534 adds the real components $X_1I$ to $X_NI$, the imaginary components $X_1Q$ to $X_NQ$, the real components $Y_1I$ to $Y_NI$, and the imaginary components $Y_1Q$ to $Y_NQ$ into which the impulse response according to the polarization and each component is convoluted, for each polarization of each polarization multiplexed reception signal. The demodulation digital signal processing unit applies phase rotation for frequency offset compensation to the addition signal to generate a first addition signal.

Similarly, the adaptive equalization unit 534 adds the real component phase conjugates $X_1I^*$ to $X_NI^*$, the imaginary component phase conjugates $X_1Q^*$ to $X_NQ^*$, the real component phase conjugates $Y_1I^*$ to $Y_NI^*$, and the imaginary component phase conjugates $Y_1Q^*$ to $Y_NQ^*$ into which the impulse response according to the polarization and each phase conjugate is convoluted, for each polarization of each polarization multiplexed reception signal. The demodulation digital signal processing unit applies phase rotation opposite to the phase rotation for frequency offset compensation to the addition signal to generate a second addition signal.

When obtaining a reception signal by adding the first addition signal and the second addition signal generated for the polarization for each polarization of each polarization multiplexed reception signal, the demodulation digital signal processing unit performs distortion correction by adding (or subtracting) a transmission data bias correction signal of the polarization.

The filter coefficients ($h_1$, . . . , $h_{4(N^2)}$) obtained in the processing of the adaptive equalization unit 534 in the demodulation digital signal processing unit and the frequency offsets ($\exp(j\omega_{x1}(n/T))$, . . . , and $(j\omega_{xN}(n/T))$) are output to the characteristic function derivation unit 538.

Figure 8:
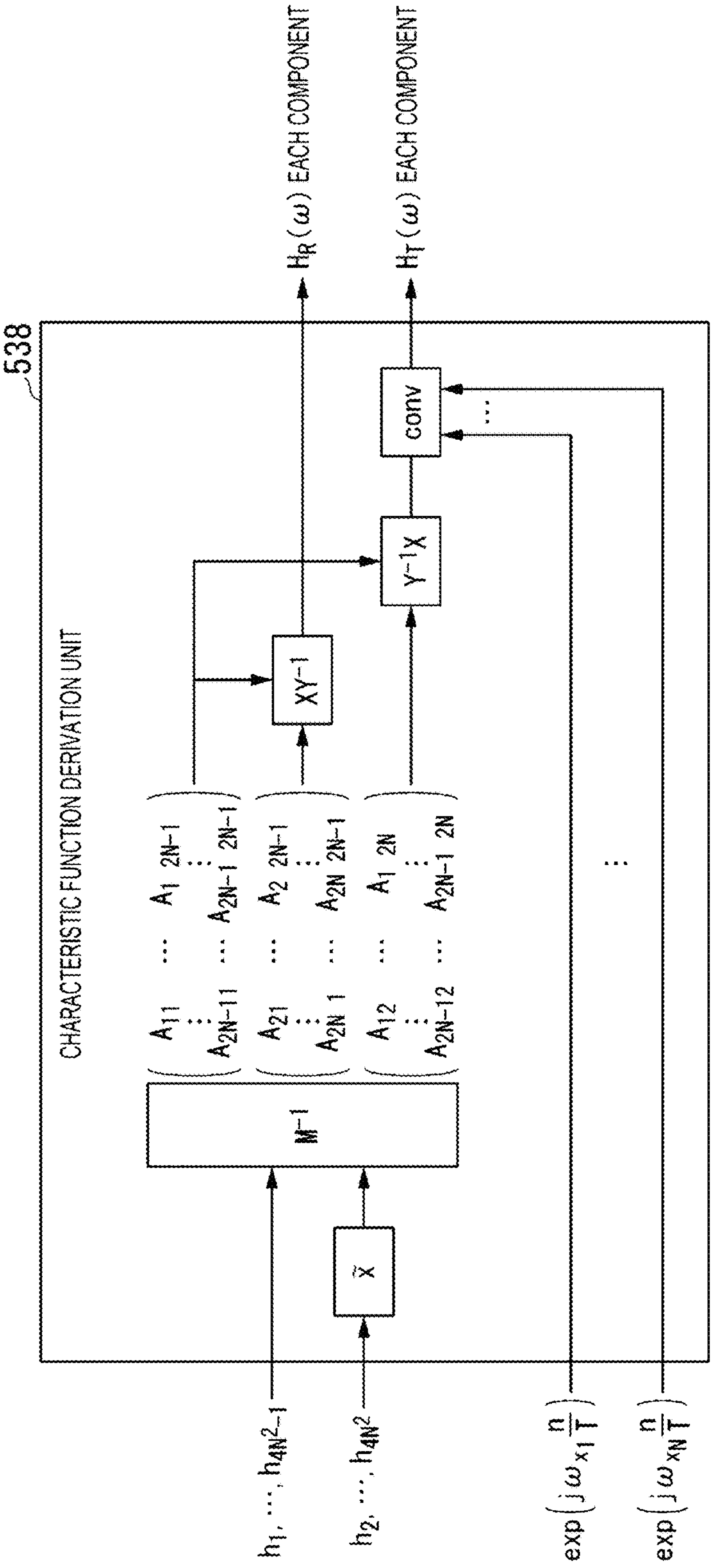
FIG. 8 is a diagram illustrating a configuration example of a characteristic function derivation unit in the second embodiment.

In the second embodiment, the characteristic function derivation unit 538 illustrated in FIG. 8 derives the characteristic $H_T(\omega)$ of the transmitter 10 and the characteristic $H_R(\omega)$ of the receiver 50 on the basis of $A(\omega)$.

The characteristic function derivation unit 538 calculates $A(\omega)$ on the basis of following Expression (29) using a matrix M defined by following Expression (28).

[Math. 28]

$$M = \begin{pmatrix} 1 & i & 0 & 0 & \ldots & 0 & 0 \\ 1 & -i & 0 & 0 & \ldots & 0 & 0 \\ 0 & 0 & 1 & i & \ldots & 0 & 0 \\ 0 & 0 & 1 & -1 & \ldots & 0 & 0 \\ \vdots & \vdots & \vdots & \vdots & & \vdots & \vdots \\ 0 & 0 & 0 & 0 & \ldots & 1 & i \\ 0 & 0 & 0 & 0 & \ldots & 1 & -1 \end{pmatrix} \quad \text{Expression (28)}$$

[Math. 29]

$$A(\omega) = M^{-1}\begin{pmatrix} h_1(\omega) & h_{2N+1}(\omega) & \ldots & h_{4N^2-2N+1}(\omega) \\ \tilde{h}_2(\omega) & \tilde{h}_{2N+2}(\omega) & \ldots & \tilde{h}_{4N^2-2N+2}(\omega) \\ \vdots & \vdots & & \vdots \\ \tilde{h}_{2N}(\omega) & \tilde{h}_{4N}(\omega) & \ldots & \tilde{h}_{4N^2}(\omega) \end{pmatrix} \quad \text{Expression (29)}$$

The characteristic function derivation unit 538 calculates the inverse characteristic $H_R^{-1}(\omega)$ of the receiver 50 on the basis of following Expression (30).

[Math. 30]

$$\begin{pmatrix} A_{21} & \ldots & A_{2\,2N-1} \\ \vdots & & \vdots \\ A_{2N\,1} & \ldots & A_{2N\,2N-1} \end{pmatrix}\begin{pmatrix} A_{11} & \ldots & A_{1\,2N-1} \\ \vdots & & \vdots \\ A_{2N-1\,1} & \ldots & A_{2N-1\,2N-1} \end{pmatrix}^{-1} \quad \text{Expression (30)}$$

The characteristic function derivation unit 538 calculates the inverse characteristic $H_T^{-1}(\omega)$ of the transmitter 10 by performing a convolution operation on $\exp(j\omega_{x1}(n/T))$, . . . , $\exp(j\omega_{xN}(n/T))$ for frequency offset compensation on following Expression (31).

[Math. 31]

$$\begin{pmatrix} A_{12} & \ldots & A_{1\,2N} \\ \vdots & & \vdots \\ A_{2N-1\,2} & \ldots & A_{2N-1\,2N} \end{pmatrix}^{-1}\begin{pmatrix} A_{11} & \ldots & A_{1\,2N-1} \\ \vdots & & \vdots \\ A_{2N-1\,1} & \ldots & A_{2N-1\,2N-1} \end{pmatrix} \quad \text{Expression (31)}$$

According to the receiver 50 in the second embodiment configured as described above, even in a case where the multiplex number is increased to N, it is possible to calculate characteristics of a transceiver including IQ crosstalk across a plurality of polarized waves.

Modification Example of Second Embodiment

As in the first embodiment, as the signal input to the adaptive equalization unit 534, a signal equivalent to the IQ signal and the phase conjugate signal of the IQ signal may be used.

Modification Example Common to First Embodiment and Second Embodiment

The adaptive equalization unit 534 and the characteristic function derivation unit 538 may be configured as a characteristic measurement device for measuring a characteristic function between lanes of the transmitter 10 and the receiver 50. In the above-described example, the configuration in which the characteristic measurement device is provided in the receiver 50 has been described, but the characteristic measurement device may be provided in a housing different from the receiver 50.

Third Embodiment

In a third embodiment, a configuration of compensating for signal waveform distortion on the basis of an inverse characteristic obtained by a characteristic function derivation unit by the method described in each of the above-described embodiments will be described. Various modifications and calculation processing described below are performed by the characteristic function derivation unit. In order to improve a signal quality using the inverse characteristic $H_T^{-1}(\omega)$ of the transmitter and the inverse characteristic $H_R^{-1}(\omega)$ of the receiver obtained in each of the above-described embodiments, a pre-equalization unit in the transmitter and a front end correction unit in the receiver have a function of performing (static) filtering processing on the signal in a corresponding format, and each inverse characteristic is input as a filter coefficient. The characteristic function derivation unit inputs the inverse characteristic $H_T^{-1}(\omega)$ of the transmitter in the pre-equalization unit in the transmitter and the inverse characteristic $H_R^{-1}(\omega)$ of the receiver in the front end correction unit in the receiver as the filter coefficient.

Herein, the inverse characteristic obtained in each of the above-described embodiments has a format of a 4×4 matrix that acts on a signal vector in a form of $(s_x(\omega)(\sim)s_x(\omega)s_y(\omega)(\sim)s_y(\omega))$, and in order to compensate for the signal waveform distortion using this, a static filter configuration in a 4×4 format that acts on the signal vector in the form described above has been required.

However, in some signal processing circuits in the transmitter and the receiver, not a complex signal vector in the above-described format but an I component (real component) and a Q component (imaginary component) of the signal are basic elements of signal processing, so that there is a case where it is better to handle the signal vector as $(\mathrm{Re}(s_x(\omega))\mathrm{Im}(s_x(\omega))\mathrm{Re}(s_y(\omega))\ \mathrm{Im}(s_y(\omega)))$ instead of the above-described format. In this case, a characteristic function derivation unit 538 may input $M^{-1}H^{-1}_{T/R}M$ to the filter as a characteristic instead of $H^{-1}_{T/R}$.

Figure 9:
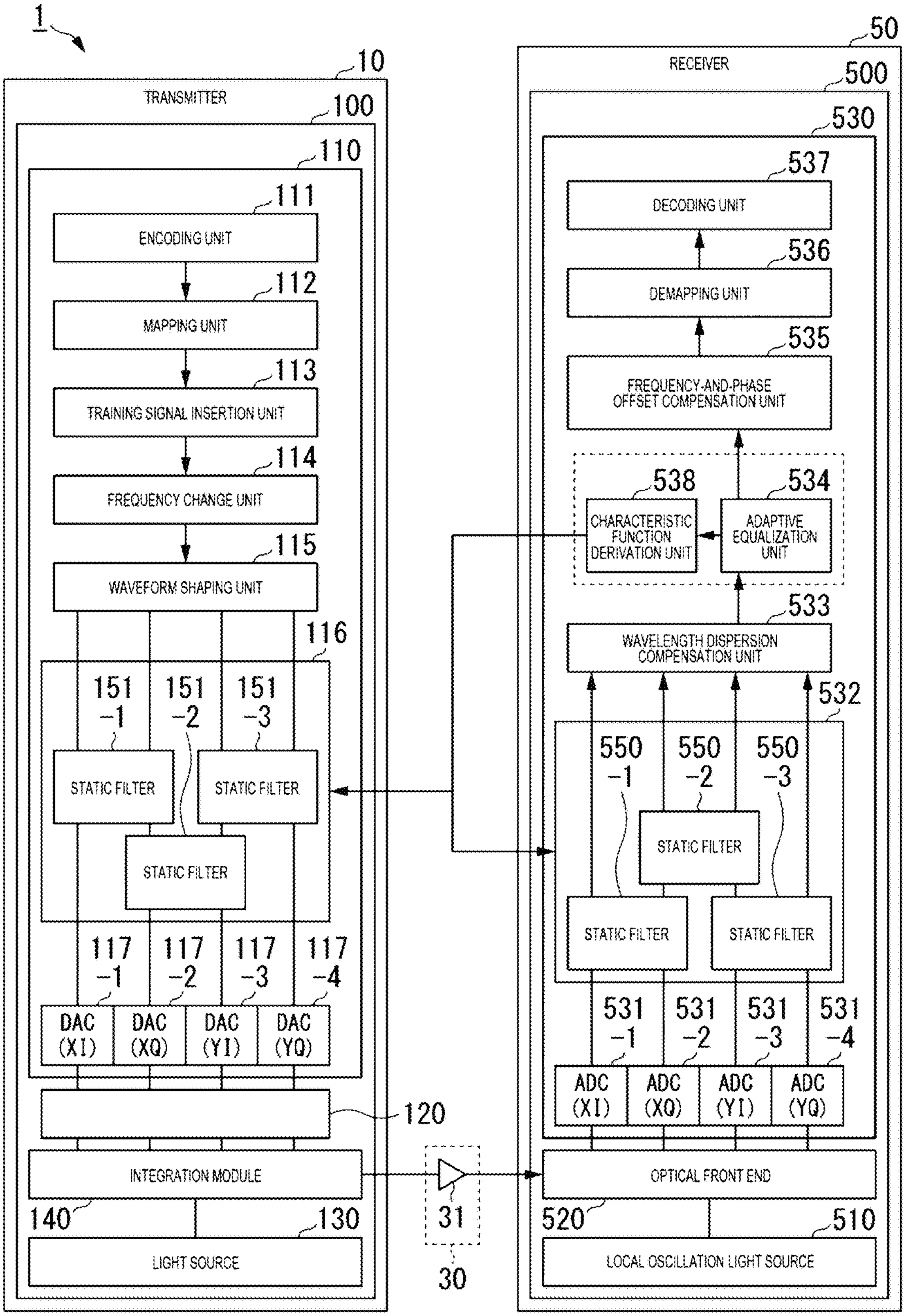
FIG. 9 is a diagram illustrating a configuration example of a digital coherent optical transmission system 1 in a third embodiment.

Hereinafter, signal processing using handling of this characteristic function is assumed. Hereinafter, a single mode fiber is assumed as a transmission medium, but a spatial multiplexing fiber is also similarly applicable. In order to further reduce an amount of calculation, as illustrated in a pre-equalization unit 116 and a front end correction unit 532 in FIG. 9, there is a case where it is desired to perform distortion compensation by using a plurality of smaller, for example, 2×2 format filters (for example, static filters 151-1 to 151-3, static filters 550-1 to 550-3) in combination. However, in this case, the inverse characteristic obtained by the above-described method cannot be directly applied to the signal processing. FIG. 9 is a diagram illustrating a configuration example of a digital coherent optical transmission system 1 in a third embodiment. The third embodiment is different from the first embodiment in configurations of the pre-equalization unit 116 and the front end correction unit 532. It is hereinafter described focusing on differences.

Figure 10:
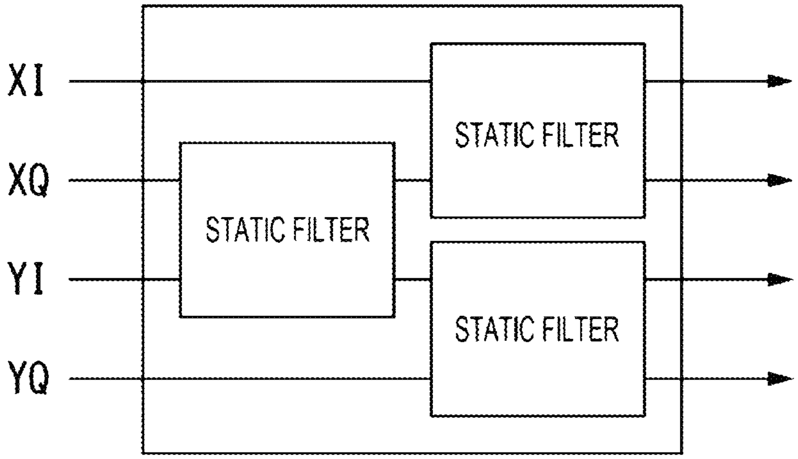
FIG. 10 is a diagram illustrating a (first) example in which a plurality of filters of a 2×2 format is combined in the third embodiment.

As an example of using a plurality of stages of filters in a 2×2 format (for example, static filters 151-1 to 151-3, static filters 550-1 to 550-3) in combination, it is considered to apply a filter including three static filters in a 2×2 format applicable to an XI lane and an XQ lane, the XQ lane and a YI lane, and the YI lane and a YQ lane, respectively, to the signal as illustrated in FIG. 10. At that time, an action of the filter on the signal expressed in a format of following Expression (32) is in a format of following Expression (33), and some components are always zero.

[Math. 32]

$$\begin{pmatrix} \mathrm{Re}(s_x(\omega)) \\ \mathrm{Im}(s_x(\omega)) \\ \mathrm{Re}(s_y(\omega)) \\ \mathrm{Im}(s_y(\omega)) \end{pmatrix} \qquad \text{Expression (32)}$$

[Math. 33]

$$\begin{pmatrix} h_{11}(\omega) & h_{12}(\omega) & 0 & 0 \\ h_{21}(\omega) & h_{22}(\omega) & h_{23}(\omega) & h_{24}(\omega) \\ h_{31}(\omega) & h_{32}(\omega) & h_{33}(\omega) & h_{34}(\omega) \\ 0 & 0 & h_{43}(\omega) & h_{44}(\omega) \end{pmatrix} \qquad \text{Expression (33)}$$

However, a transceiver characteristic represented by $M^{-1}H^{-1}_{T/R}M$ cannot be handled by the filter of the configuration of this example because the above-described component is not zero in general. More generally, as for a characteristic matrix input to a filter for characteristic compensation, there is a case where only a certain (i,j) component must necessarily be zero. In the third embodiment, as described above, in a case where a plurality of static filters for compensating for a characteristic between some lanes is provided, and compensation is wanted to be performed by a combination thereof, a value to be input to the filter can be obtained from the inverse characteristic by an appropriate operation.

A method of modification will be specifically described below. First, a transmission side will be described below. Regarding the transceiver characteristic, even if a matrix representing any polarization rotation and phase rotation is multiplied on the transmission path side, this may be regarded as the same transceiver characteristic, so that as for any $H_c(\omega)$ in the form of following Expression (34), even if the inverse characteristic $H^{-1}_T$ of the transmitter is multiplied by $H_c(\omega)$ from the left and a function to be input to the filter (for example, the pre-equalization unit 116) is set to $M^{-1}H_c(\omega)H^{-1}_TM$, there is no change in compensation effect.

[Math. 34]

$$H_c(\omega) := \begin{pmatrix} h_{c,11}(\omega) & 0 & h_{c,13}(\omega) & 0 \\ 0 & \tilde{h}_{c,11}(\omega) & 0 & \tilde{h}_{c,13}(\omega) \\ h_{c,31}(\omega) & 0 & h_{c,33}(\omega) & 0 \\ 0 & \tilde{h}_{c,31}(\omega) & 0 & \tilde{h}_{c,33}(\omega) \end{pmatrix} \qquad \text{Expression (34)}$$

Therefore, $H_c(\omega)$ may be determined so as to satisfy a condition of a format of the filter that is wanted to be obtained. For this purpose, an equation of following Expression (35) may be solved for all (i,j) in which the (i,j) component of the characteristic matrix is zero.

[Math. 35]

$$\left(M^{-1}H_c(\omega)H_T^{-1}M\right)_{ij} = 0 \qquad \text{Expression (35)}$$

Herein, a subscript of the matrix represents a matrix component. In the present technology, the characteristic function derivation unit 538 obtains $H_c(\omega)$ as a solution of the above Expression (35), and sets $M^{-1}H_c(\omega)H^{-1}_TM$ as a coefficient to be input to the filter. Herein, a configuration in FIG. 10 is considered as an example. In this case, since the equation of above Expression (35) is solved for (i,j)=(1,3), (1,4), (4,1), and (4,2) and following Expression (36) exists as a solution thereof, when $M^{-1}H_c(\omega)\ H^{-1}_TM$ is calculated on the basis of this, compensation by the filter becomes possible.

[Math. 36]

$$H_c(\omega) = \begin{pmatrix} 1 & 0 & \frac{-\tilde{h}_{T23}}{\tilde{h}_{T43}-1} & 0 \\ 0 & 1 & 0 & \frac{-h_{T23}}{h_{T43}-1} \\ \frac{-\tilde{h}_{T41}}{\tilde{h}_{T21}+1} & 0 & 1 & 0 \\ 0 & \frac{-h_{T41}}{h_{T21}+1} & 0 & 1 \end{pmatrix} \qquad \text{Expression (36)}$$

As for the reception side characteristic, similarly to the transmission side, the characteristic function derivation unit 538 obtains $H_c(\omega)$ as a solution of following Expression (37), and sets $M^{-1}H^{-1}_RH_c(\omega)M$ as a coefficient to be input to the filter (for example, the front end correction unit 532).

[Math. 37]

$$\left(M^{-1}H_R^{-1}H_c(\omega)M\right)_{ij} = 0 \qquad \text{Expression (37)}$$

In this case, since an equation of above Expression (37) is solved for (i,j)=(1,3), (1,4), (4,1), and (4,2) as above and following Expression (38) exists as a solution thereof, when $M^{-1}H^{-1}_RH_c(\omega)M$ is calculated on the basis of this, compensation by the filter becomes possible.

[Math. 38]

$$H_c(\omega)=\begin{pmatrix} 1 & 0 & \dfrac{h_{R32}-h_{R34}\tilde{h}_{R32}}{h_{R34}\tilde{h}_{R34}-1} & 0 \\ 0 & 1 & 0 & \dfrac{\tilde{h}_{R32}-h_{R32}\tilde{h}_{R34}}{h_{R34}\tilde{h}_{R34}-1} \\ \dfrac{-h_{R14}-h_{R12}\tilde{h}_{R14}}{h_{R12}\tilde{h}_{R12}-1} & 0 & 1 & 0 \\ 0 & \dfrac{-\tilde{h}_{R14}-h_{R14}\tilde{h}_{R12}}{h_{R12}\tilde{h}_{R12}-1} & 0 & 1 \end{pmatrix} \quad \text{Expression (38)}$$

Figure 11:
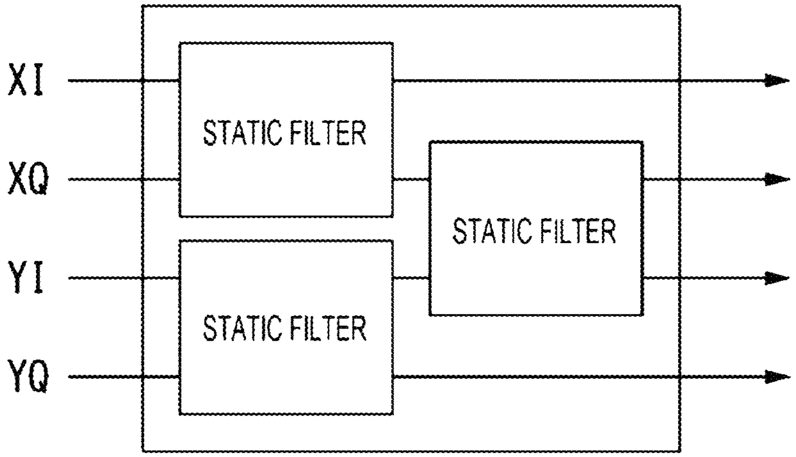
FIG. 11 is a diagram illustrating a (second) example in which a plurality of filters of a 2×2 format is combined in the third embodiment.

Next, as an example, a configuration illustrated in FIG. 11 will be considered. In this case, by solving a similar equation as for (i,j)=(1,4), (2,4), (3,1), and (4,1), following Expression (39) is obtained in a case of the transmission side, and following Expression (40) is obtained in a case of the reception side.

[Math. 39]

$$H_c(\omega)=\begin{pmatrix} 1 & 0 & \dfrac{h_{T23}-h_{T43}\tilde{h}_{T23}}{h_{T43}\tilde{h}_{T43}-1} & 0 \\ 0 & 1 & 0 & \dfrac{\tilde{h}_{T23}-h_{T23}\tilde{h}_{T43}}{h_{T43}\tilde{h}_{T43}-1} \\ \dfrac{-h_{T41}-h_{T21}\tilde{h}_{T41}}{h_{T21}\tilde{h}_{T21}-1} & 0 & 1 & 0 \\ 0 & \dfrac{-\tilde{h}_{T41}-h_{T41}\tilde{h}_{T21}}{h_{T21}\tilde{h}_{T21}-1} & 0 & 1 \end{pmatrix} \quad \text{Expression (39)}$$

[Math. 40]

$$H_c(\omega)=\begin{pmatrix} 1 & 0 & \dfrac{-\tilde{h}_{R32}}{\tilde{h}_{R34}-1} & 0 \\ 0 & 1 & 0 & \dfrac{-h_{R32}}{h_{R34}-1} \\ \dfrac{-\tilde{h}_{R14}}{\tilde{h}_{R12}+1} & 0 & 1 & 0 \\ 0 & \dfrac{-h_{R14}}{h_{R12}+1} & 0 & 1 \end{pmatrix} \quad \text{Expression (40)}$$

Figure 12:
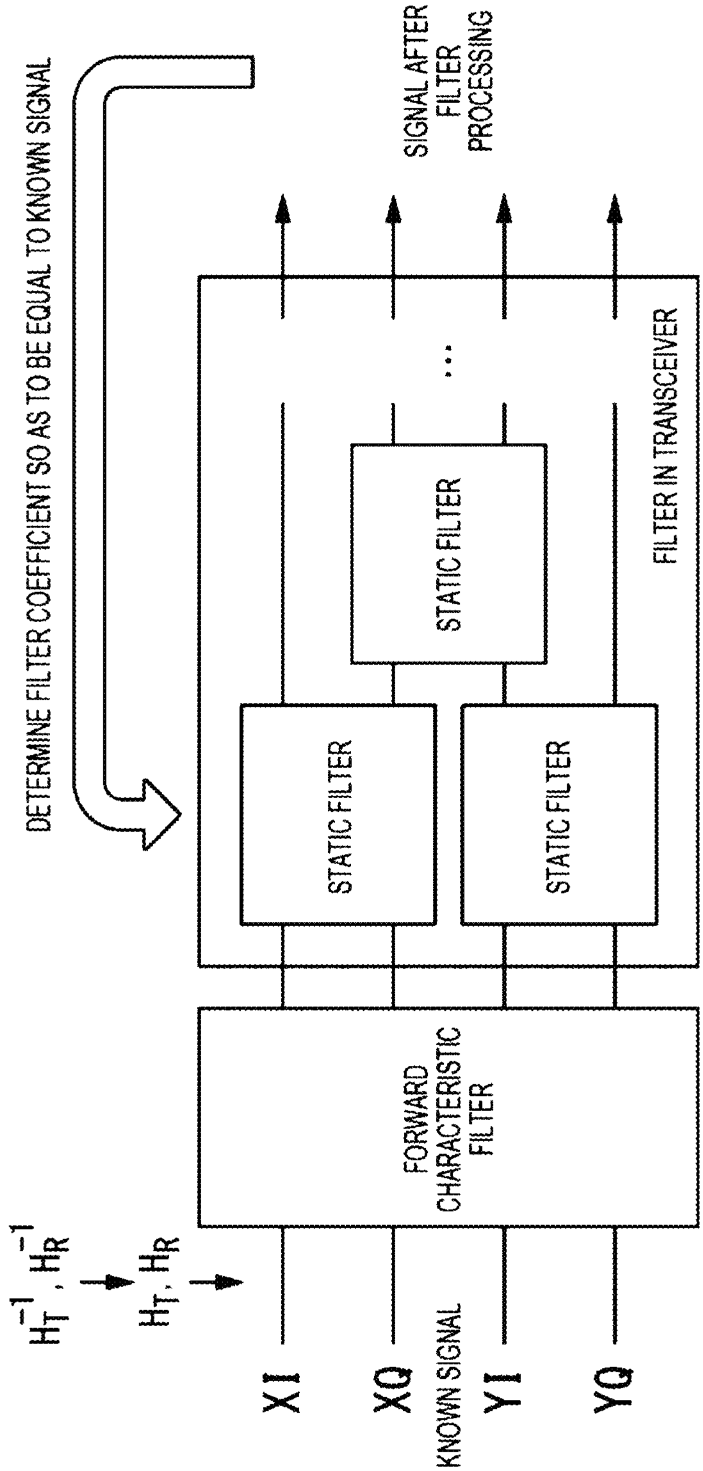
FIG. 12 is a diagram illustrating an example of a method of determining a value to be input to a filter in the third embodiment.

The method of determining the value to be input to the filter may be other than that in the above-described method. For example, as illustrated in FIG. 12, processing of calculating the characteristic $H_T$ of the transmitter 10 from the inverse characteristic $H^{-1}{}_T$ of the transmitter 10, multiplying the same by signal processing by a known signal, and then applying a static filter may be considered, and at that time, the filter coefficient of the static filter may be determined by a least squares method or the like so as to minimize a difference between the signal after the filter processing and the initial known signal.

Regarding all the embodiments described above, when the adaptive filter is operated, characteristics may be calculated using the known signal or a signal demodulated by an error correction code as a target of the filter for the purpose of convergence of the received signal. In this case, there is a feature that the transmitter and the receiver are reversed on the expression, and not an inverse characteristic but a forward characteristic of the transceiver is obtained. It is possible to perform the same discussion as in the above-described embodiment by appropriately switching the transmission side and the reception side and performing inverse matrix calculation of the matrix.

Some functional units of the receiver 50 in the above-described embodiments may be implemented by a computer. In this case, a program for implementing this function may be recorded in a computer-readable recording medium, and the program recorded in the recording medium may be read and executed by a computer system to implement the function. Note that, the "computer system" herein includes an OS and hardware such as peripheral devices.

The "computer-readable recording medium" refers to a portable medium such as a flexible disk, a magneto-optical disk, a read only memory (ROM), or a CD-ROM, or a storage device such as a hard disk included in a computer system, for example. Moreover, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. The above-described program may be for implementing some of the functions described above, may be implemented by a combination of the functions described above and a program already recorded in a computer system, or may be implemented with a programmable logic device such as a field-programmable gate array (FPGA).

Although the embodiments of the present invention have been described in detail with reference to the drawings, the specific configuration is not limited to the embodiments, and includes design and the like without departing from the gist of the present invention.

INDUSTRIAL APPLICABILITY

The present invention is applicable to a technology of measuring characteristics of a transmitter and a receiver.

| Reference Signs List | |
|---|---|
| 10 | Transmitter |
| 30 | Optical fiber transmission path |
| 50 | Receiver |
| 100 | Transmission unit |
| 110 | Digital signal processing unit |
| 111 | Encoding unit |
| 112 | Mapping unit |
| 113 | Training signal insertion unit |
| 114 | Frequency change unit |
| 115 | Waveform shaping unit |
| 116 | Pre-equalization unit |
| 117-1 to 117-4 | Digital-to-analog converter (DAC) |
| 120 | Modulator driver |
| 121-1 to 121-4 | Amplifier |
| 130 | Light source |
| 140 | Integration module |
| 141-1, 141-2 | IQ modulator |
| 142 | Polarization synthesis unit |
| 500 | Reception unit |
| 510 | Local oscillation light source |
| 520 | Optical front end |
| 521 | Polarization separation unit |
| 522-1, 522-2 | Optical 90-degree hybrid coupler |
| 523-1 to 523-4 | BPD |
| 524-1 to 524-4 | Amplifier |
| 530 | Digital signal processing unit |
| 531-1 to 531-4 | Analog-to-digital converter |
| 532 | Front end correction unit |
| 533 | Wavelength dispersion compensation unit |
| 534 | Adaptive equalization unit |
| 535 | Frequency-and-phase offset compensation unit |
| 536 | Demapping unit |
| 537 | Decoding unit |
| 538 | Characteristic function derivation unit |

The invention claimed is:

1. A characteristic measurement device that measures a characteristic between lanes of a transmitter and a receiver connected via an optical fiber transmission path, the characteristic measurement device comprising:

an adaptive equalizer configured to use a polarization multiplexed reception signal and a phase conjugate signal of the polarization multiplexed reception signal or a plurality of signals mathematically equivalent to the reception signal and the phase conjugate signal of the reception signal as input signals and performs equalization processing on the input signals; and a characteristic function deriver configured to calculate a first inverse characteristic representing an inverse characteristic of the transmitter and a second inverse characteristic representing an inverse characteristic of the receiver on the basis of a filter coefficient obtained at a time of the equalization processing performed by the adaptive equalizer and a frequency offset.

2. The characteristic measurement device according to claim 1, wherein the characteristic function deriver calculates the first inverse characteristic and the second inverse characteristic including IQ crosstalk across a plurality of spatially multiplexed signals.

3. The characteristic measurement device according to claim 1, wherein the characteristic function deriver calculates the first inverse characteristic and the second inverse characteristic including IQ crosstalk across a plurality of wavelength multiplexed signals.

4. The characteristic measurement device according to claim 1, wherein the plurality of signals mathematically equivalent to the reception signal and the phase conjugate signal of the reception signal are signals obtained by performing wavelength dispersion compensation on each of a complex signal and a phase conjugate signal of the complex signal, and phase conjugate signals of the signals on which the wavelength dispersion compensation is performed.

5. The characteristic measurement device according to claim 1, having a function of multiplying the first inverse characteristic and the second inverse characteristic by a matrix representing a degree of freedom of polarization rotation and phase rotation to transform the first inverse characteristic and the second inverse characteristic into a format capable of being handled by a combination of filters that compensate for a characteristic between some lanes of the transmitter and the receiver.

6. The characteristic measurement device according to claim 1, having a function of causing a forward characteristic obtained from the first inverse characteristic and the second inverse characteristic to act on a known signal and determining a filter coefficient so as to cancel the forward characteristic to transform the forward characteristic into a format capable of being handled by a combination of filters that compensate for a characteristic between some lanes of the transmitter and the receiver.

7. An optical transmission system comprising: the characteristic measurement device according to claim 1; and the transmitter and the receiver having a filter function of compensating for signal waveform distortion on the basis of the first inverse characteristic and the second inverse characteristic obtained by the characteristic measurement device.

8. A characteristic measurement method performed by a characteristic measurement device that measures a characteristic between lanes of a transmitter and a receiver connected via an optical fiber transmission path, the characteristic measurement method comprising:

using a polarization multiplexed reception signal and a phase conjugate signal of the polarization multiplexed reception signal or a plurality of signals mathematically equivalent to the reception signal and the phase conjugate signal of the reception signal as input signals and performing equalization processing on the input signals; and calculating a first inverse characteristic representing an inverse characteristic of the transmitter and a second inverse characteristic representing an inverse characteristic of the receiver on the basis of a filter coefficient obtained at a time of the equalization processing and a frequency offset.

9. A non-transitory storage medium that stores a program when that executed by a computer causes the computer perform processes as a characteristic measurement device that measures a characteristic between lanes of a transmitter and a receiver connected via an optical fiber transmission path, the processes comprising:

using a polarization multiplexed reception signal and a phase conjugate signal of the polarization multiplexed reception signal or a plurality of signals mathematically equivalent to the reception signal and the phase conjugate signal of the reception signal and performing equalization processing on the input signals; and calculating a first inverse characteristic representing an inverse characteristic of the transmitter and a second inverse characteristic representing an inverse characteristic of the receiver on the basis of a filter coefficient obtained at a time of the equalization processing performed and a frequency offset.

* * * * *